US012037757B2

(12) United States Patent
Lev

(10) Patent No.: US 12,037,757 B2
(45) Date of Patent: Jul. 16, 2024

(54) INFRARED RETROREFLECTIVE SPHERES FOR ENHANCED ROAD MARKS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

(*) Notice: Subject to any disclaimer, the term of this patent is extended or adjusted under 35 U.S.C. 154(b) by 378 days.

(21) Appl. No.: 17/577,067

(22) Filed: Jan. 17, 2022

(65) Prior Publication Data
US 2022/0282436 A1    Sep. 8, 2022

Related U.S. Application Data

(63) Continuation-in-part of application No. 17/313,161, filed on May 6, 2021, now Pat. No. 11,881,033, which is a continuation-in-part of application No. 17/191,793, filed on Mar. 4, 2021.

(51) Int. Cl.
*E01F 9/524* (2016.01)
*C09D 1/00* (2006.01)
*C09D 5/33* (2006.01)
*E01F 9/518* (2016.01)

(52) U.S. Cl.
CPC ............... *E01F 9/524* (2016.02); *C09D 1/00* (2013.01); *C09D 5/004* (2013.01); *E01F 9/518* (2016.02)

(58) Field of Classification Search
CPC .. G06V 20/56; G06G 1/096791; B60T 8/172; B60T 2210/12; G01N 21/9501; G01N 21/59
See application file for complete search history.

(56) References Cited

U.S. PATENT DOCUMENTS

| 4,219,092 A | 8/1980 | Richter |
| 4,690,553 A * | 9/1987 | Fukamizu ............... G06V 20/54 |
| | | 250/341.8 |
| 5,203,923 A | 4/1993 | Hartman |
| 5,296,256 A | 3/1994 | Hartman |
| 5,599,133 A | 2/1997 | Costello et al. |

(Continued)

OTHER PUBLICATIONS

Babic et al. "Application and Characteristics of Waterborne Road Marking Paint", International Journal or Traffic and Transport Engineering, 5(2): 150-169, Jun. 1, 2015.

(Continued)

*Primary Examiner* — Yosef Kassa

(57) ABSTRACT

Disclosed herein are methods and systems for enhancing road markings using Infrared (IR) retroreflective spherical elements, comprising immersing a plurality of IR retroreflective spherical elements in one or more paint materials to produce a composition applied to paint road markings on one or more surfaces of one or more road segments. Each of the plurality of IR retroreflective spherical elements is at least partially transparent in visible light spectral range and in one or more infrared spectral ranges and is at least partially coated with one or more IR reflective materials characterized by (1) reflecting more than a first value of light in the one or more infrared spectral ranges, and (2) transferring more than a second value of light in the visible light spectral range. The painted road markings expressing driving information relating to the one or more road segments.

20 Claims, 14 Drawing Sheets

(56) References Cited

U.S. PATENT DOCUMENTS

| | | | |
|---|---|---|---|
| 6,074,693 A | 6/2000 | Manning | |
| 6,228,901 B1 | 5/2001 | Brown | |
| 6,398,369 B1 | 6/2002 | Starling | |
| 6,498,570 B2 | 12/2002 | Ross | |
| 6,519,884 B1 | 2/2003 | Duhamel | |
| 6,729,706 B1 | 5/2004 | Patton et al. | |
| 6,741,186 B2 | 5/2004 | Ross | |
| 6,774,988 B2 * | 8/2004 | Stam | G01J 1/32 362/465 |
| 6,827,522 B2 | 12/2004 | Kodama et al. | |
| 6,887,011 B2 | 5/2005 | Snagel | |
| 6,922,636 B2 | 7/2005 | Balasubramanian et al. | |
| 7,025,527 B2 | 4/2006 | Mccham | |
| 7,348,496 B2 * | 3/2008 | Wermer | H05K 1/115 174/262 |
| 7,552,008 B2 | 6/2009 | Newstrom et al. | |
| 7,652,584 B2 * | 1/2010 | Fridthjof | B60T 8/172 340/580 |
| 7,866,917 B2 | 1/2011 | Malit | |
| 8,040,248 B2 * | 10/2011 | Fridthjof | B60T 8/172 340/580 |
| 8,208,021 B2 | 6/2012 | Unoura | |
| 8,503,728 B2 | 8/2013 | Takahashi | |
| 8,537,338 B1 | 9/2013 | Medasani et al. | |
| 8,849,508 B2 | 9/2014 | Ibrahim et al. | |
| 8,958,982 B2 | 2/2015 | Sempuku et al. | |
| 9,230,183 B2 | 1/2016 | Bechtel et al. | |
| 9,594,021 B2 * | 3/2017 | Lin | G01N 21/9501 |
| 9,721,460 B2 | 8/2017 | Takemura et al. | |
| 9,784,843 B2 | 10/2017 | Dolinar et al. | |
| 10,147,320 B1 | 12/2018 | Ellis | |
| 10,309,788 B2 | 6/2019 | Davidson | |
| 10,635,896 B2 | 4/2020 | Heimberger et al. | |
| 10,921,815 B2 | 2/2021 | Bell et al. | |
| 11,054,538 B1 | 7/2021 | MacVittie et al. | |
| 11,300,415 B2 | 4/2022 | Ishida | |
| 2022/0198200 A1 | 6/2022 | LaPonse | |
| 2022/0284223 A1 | 9/2022 | Lev | |
| 2022/0284224 A1 | 9/2022 | Lev | |
| 2022/0284225 A1 | 9/2022 | Lev | |
| 2022/0284226 A1 | 9/2022 | Lev | |

OTHER PUBLICATIONS

Smith "Refelective Road Markings Improve Visibility, Safety", Road Markings, Barriers & Workzone Protection, 4 P., Feb. 13, 2012.
Official Action Dated Feb. 15, 2024 from the US Patent and Trademark Office Re. U.S. Appl. No. 17/191,793. (29 pages).
Notice of Allowance Dated Feb. 12, 2024 from the US Patent and Trademark Office Re. U.S. Appl. No. 17/372,659. (7 pages).
Notice of Allowance Dated Oct. 4, 2023 from the US Patent and Trademark Office Re. U.S. Appl. No. 17/327,973. (13 pages).
Notice of Allowance Dated Sep. 20, 2023 from the US Patent and Trademark Office Re. U.S. Appl. No. 17/313,161. (13 pages).
Official Action Dated Dec. 12, 2023 From the US Patent and Trademark Office Re. U.S. Appl. No. 17/372,659. (17 Pages).

* cited by examiner

Visible light no directed beam

Visible light with directed beam

IR light no directed beam

IR light with directed beam

INFRARED RETROREFLECTIVE SPHERES FOR ENHANCED ROAD MARKS

RELATED APPLICATIONS

This application is a Continuation-in-Part (CIP) of U.S. patent application Ser. No. 17/313,161 filed on May 6, 2021, which is a Continuation-in-Part (CIP) of U.S. patent application Ser. No. 17/191,793 filed on Mar. 4, 2021. The contents of the above applications are all incorporated by reference as if fully set forth herein in their entirety.

BACKGROUND

The present invention, in some embodiments thereof, relates to enhancing road markings to support automated vehicular systems, and, more specifically, but not exclusively, to enhancing road markings using paint comprising Infrared (IR) retroreflective spherical elements having different visibility characteristics in visible and IR spectral ranges, specifically IR retroreflective elements which are visible in the infrared spectrum while imperceptible in the human visible light spectrum.

Road markings have evolved over the years since the introduction of motorized vehicles and the development of roads infrastructures to host these vehicles in order to assist drivers to grasp and understand their motorized environment and take actions accordingly.

Recent times have witnessed major advancement, evolution and in fact revolution in the development and deployment of automated vehicular systems which were initially designed to assist the human drivers and are now aiming to make the vehicles at least partially autonomous and eventually fully autonomous.

Such automated vehicular systems may also rely at least partially on the road markings for their operation, for example, monitor lanes, detect road objects (margins, pedestrian crossings, sidewalks, traffic lights, etc.), control operation of the vehicles (e.g. slow down and/or break in front of traffic circle, maneuver to maintain lane, take turns, etc.) and/or the like.

SUMMARY

According to a first aspect of the present invention there is provided a method of enhancing road markings using Infrared (IR) retroreflective spherical elements, comprising immersing a plurality of IR retroreflective spherical elements in one or more paint materials to produce a composition. Each of the plurality of IR retroreflective spherical elements is at least partially transparent in visible light spectral range and in one or more infrared spectral ranges and is at least partially coated with one or more IR reflective materials characterized by (1) reflecting more than a first value of light in the one or more infrared spectral ranges, and (2) transferring more than a second value of light in the visible light spectral range. Wherein the composition is applied to paint road markings on one or more surfaces of one or more road segments. The painted road markings expressing driving information relating to the one or more road segments.

According to a second aspect of the present invention there is provided a system for enhancing road markings using Infrared (IR) retroreflective spherical elements, comprising one or more processors configured to execute code. The code comprising code instructions to immerse a plurality of IR retroreflective spherical elements in one or more paint materials to produce a composition. Each of the plurality of IR retroreflective spherical elements is at least partially transparent in visible light spectral range and in one or more infrared spectral ranges and is at least partially coated with one or more IR reflective materials characterized by (1) reflecting more than a first value of light in the one or more infrared spectral ranges, and (2) transferring more than a second value of light in the visible light spectral range. Wherein the composition is applied to paint road markings on one or more surfaces of one or more road segments. The road markings expressing driving information relating to the one or more road segments.

According to a third aspect of the present invention there is provided a method of enhancing road markings using Infrared (IR) retroreflective spherical elements, comprising immersing a plurality of IR retroreflective spherical elements in one or more paint materials to produce a composition. Each of the plurality of IR retroreflective spherical elements is at least partially transparent in visible light spectral range and in one or more infrared spectral ranges and is at least partially coated with one or more IR reflective materials characterized by (1) reflecting more than a third value of light in the one or more infrared spectral ranges, and (2) reflecting light in the visible light spectral range deviating less than a fourth value from the light reflected in the visible light spectral by the one or more paint materials. Wherein the composition is applied to paint road markings on one or more surfaces of one or more road segments. The road markings expressing driving information relating to the one or more road segments.

According to a fourth aspect of the present invention there is provided a system for enhancing road markings using Infrared (IR) retroreflective spherical elements, comprising one or more processors configured to execute code. The code comprising code instructions to immerse a plurality of IR retroreflective spherical elements in one or more paint materials to produce a composition. Each of the plurality of IR retroreflective spherical elements is at least partially transparent in visible light spectral range and in one or more infrared spectral ranges and is at least partially coated with one or more IR reflective materials characterized by (1) reflecting more than a third value of light in the one or more infrared spectral ranges, and (2) reflecting light in the visible light spectral range deviating less than a fourth value from the light reflected in the visible light spectral by the one or more paint materials. Wherein the composition is applied to paint road markings on one or more surfaces of one or more road segments. The road markings expressing driving information relating to the one or more road segments.

In a further implementation form of the first, second, third and/or fourth aspects, the plurality of IR retroreflective spherical elements are distributed in the one or more paint materials in random orientation.

In a further implementation form of the first, second, third and/or fourth aspects, the plurality of IR retroreflective spherical elements are distributed in the one or more paint materials in directed orientation with their concave surface coated with the one or more IR reflective materials facing a common direction towards an exterior surface of the composition.

According to a fifth aspect of the present invention there is provided a method of enhancing road markings using Infrared (IR) retroreflective spherical elements, comprising immersing a plurality of IR retroreflective spherical elements in one or more background paint materials to produce a composition. The one or more background paint materials reflect more than a fifth value of light in one or more infrared spectral ranges. Each of the plurality of IR retroreflective spherical elements is constructed of one or more infrared transparent materials mixed with one or more pigments characterized by (1) transferring more than a sixth value of light in the one or more infrared spectral ranges, and (2) reflecting light deviating less than a seventh value from the light reflected by the one or more background paint materials in visible light spectral range. Wherein the composition is applied to paint road markings on one or more surfaces of one or more road segments. The painted road markings expressing driving information relating to the one or more road segments.

According to a sixth aspect of the present invention there is provided a system for enhancing road markings using Infrared (IR) retroreflective spherical elements, comprising one or more processors configured to execute code. The code comprising code instructions to immerse a plurality of IR retroreflective spherical elements in one or more background paint materials to produce a composition. The one or more background paint materials reflect more than a first value of light in one or more infrared spectral ranges. Each of the plurality of IR retroreflective spherical elements is constructed of one or more IR transparent materials mixed with one or more pigments characterized by (1) transferring more than a first value of light in the one or more IR light spectral ranges, and (2) reflecting light deviating less than a second value from the light reflected by the one or more background paint materials in visible light spectral range. Wherein the composition is applied to paint road markings on one or more surfaces of one or more road segments. The road markings expressing driving information relating to the one or more road segments.

In a further implementation form of the first, second, third, fourth, fifth and/or sixth aspects, the plurality of IR retroreflective spherical elements are produced of one or more at least partially transparent materials which is a member of a group consisting of: glass, silicate glass, Plexiglass and polymer.

In a further implementation form of the first, second, third, fourth, fifth and/or sixth aspects, the one or more IR spectral ranges are members of a group consisting of: near infrared (NIR) having a wavelength in a range of 700-1000 nanometers and short wave infrared (SWIR) having a wavelength in a range of 1000-3000 nanometers.

In a further implementation form of the first, second, third, fourth, fifth and/or sixth aspects, at least some of the plurality of IR retroreflective spherical elements protrude partially from a surface of the one or more background paint materials.

In a further implementation form of the first, second, third, fourth, fifth and/or sixth aspects, the one or more surfaces are members of a group consisting of: a surface of the one or more road segments, a colored mark printed on the one or more road segments and an infrastructure object located in proximity to the one or more road segments.

In a further implementation form of the first, second, third, fourth, fifth and/or sixth aspects, the driving information is directed to support one or more automatic vehicular systems of one or more vehicles. The one or more automatic vehicular systems receive one or more images of the one or more surfaces painted with the road markings captured by one or more imaging sensors adapted to operate in the one or more infrared spectral ranges.

In a further implementation form of the first and/or second aspects, the first value is larger than 25%.

In a further implementation form of the first and/or second aspects, the second value is larger than 70%.

In a further implementation form of the third and/or fourth aspects, the third value is larger than 25%.

In a further implementation form of the third and/or fourth aspects, the fourth value is less than 25%.

In a further implementation form of the fifth and/or sixth aspects, the fifth value is larger than 25%.

In a further implementation form of the fifth and/or sixth aspects, the sixth value is larger than 70%.

In a further implementation form of the fifth and/or sixth aspects, the seventh value is less than 25%.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
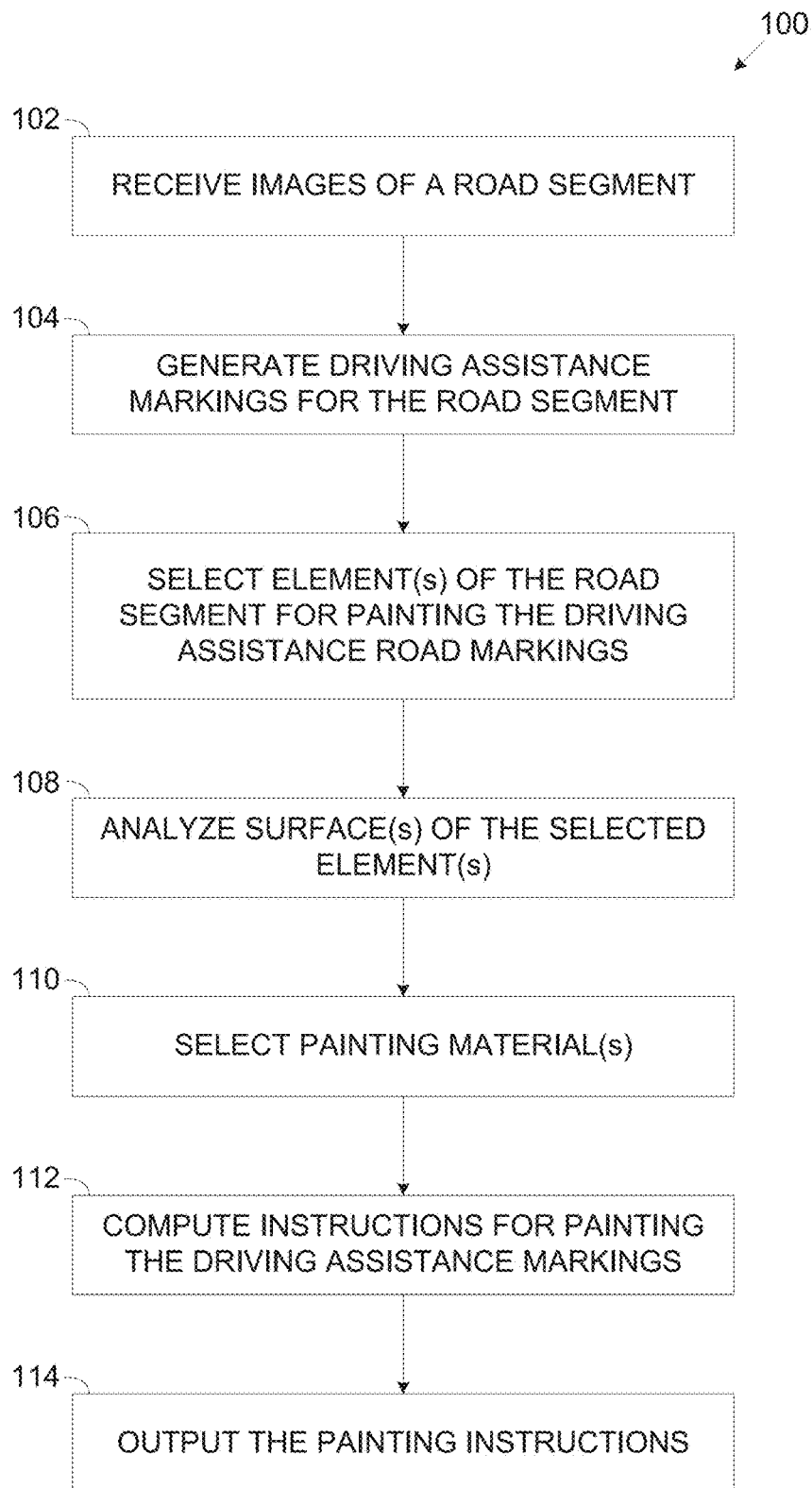
FIG. 1 is a flowchart of an exemplary process of computing instructions for painting driving assistance marking using paint material(s) visible in the infrared spectrum while imperceptible in the visible light spectrum, according to some embodiments of the present invention.

The present invention, in some embodiments thereof, relates to enhancing road markings to support automated vehicular systems, and, more specifically, but not exclusively, to enhancing road markings using paint comprising Infrared (IR) retroreflective spherical elements having different visibility characteristics in visible and IR spectral ranges, specifically IR retroreflective elements which are visible in the infrared spectrum while imperceptible in the human visible light spectrum.

According to some embodiments of the present invention, there are provided methods, systems and computer program products for computing instructions for painting road markings and/or driving assistance markings which are highly visible in the infrared light spectrum while highly imperceptible in the visible light spectrum. In particular, the driving assistance markings may significantly blend with their background in the visible light range making them significantly imperceptible by the human eye and thus invisible to human drivers.

The term imperceptible as used herein through the document defines objects, markings, printing and/or the like, in particular driving assistance markings which may not be perceived by the human eye since they reflect light in a spectral range which is out of the visible light spectral range (400-700 nanometer).

The terms reflect, reflection, reflective and/or the like are used herein through the document to describe light reflection characteristics of light of objects, elements and/or materials. Light reflection, however, may be also construed and/or regarded as light absorption where reflection relates to the amount of reflected light while absorption relates to the amount of absorbed light. The terms reflect, reflection, reflective and/or the like used herein after may therefore also refer to absorb, absorptive, absorption and/or the like.

These driving assistance markings and which are highly imperceptible to the human drivers are therefore directed to support automated vehicular systems, for example, an Advanced Driving Assistance System (ADAS), a vehicular monitoring system, a vehicular alert system, a vehicular control system and/or the like installed in one or more vehicles which may be manual, partially autonomous and/or fully autonomous.

Specifically, the driving assistance markings are directed for such automated vehicular systems which are capable of operating in the infrared light spectrum, in particulate, systems which are coupled, integrated and/or connected to one or more imaging sensors, for example, a camera, an infrared camera, a thermal mapping camera and/or the like configured to capture images of the vehicle's surroundings in the infrared spectrum, for example, Near Infrared (NIR), Short Wave Infrared (SWIR) and/or the like.

The driving assistance markings generated for one or more road segments may express informative directions and/or operation assistance information. For example, one or more informative driving assistance markings may indicate presence and optionally distance to one or more objects in the respective road segment and/or of one or more subsequent road segments, for example, a pedestrian crossing, a railroad crossing, a traffic light, a junction, a maximal allowed speed and/or the like. In another example, one or more operation assistance driving assistance markings may include markers, pointers, guides, keys and/or the like which may be identified and used by the automated vehicular systems to maneuver the vehicles, for example, break, accelerate, decelerate, turn and/or the like.

While the road markings and/or assistance markings may be painted on road segments to support automated vehicular systems, other markings and/or assistance markings may be painted using similar systems and methods to support other systems and/or platforms, for example, automated robots moving on paths, roads, trails and/or the like in one or more indoor and/or outdoor facilities (e.g. warehouse, hall, etc.) which are marked with the markings and/or assistance markings.

The driving assistance markings generated for the road segment(s) may be painted (applied) on one or more elements of the respective road segment, for example, one or more surface sections of the road segment, one or more colored marks painted on the road segment (e.g., lane separator lines, arrows, stop lines, pedestrian crossings, etc.) and/or one or more infrastructure objects located in proximity to the road segment (e.g., next to, on, above, etc.), for example, pavement surfaces and/or edges, traffic poles, traffic lights, structure walls and/or the like.

In order to ensure that the driving assistance markings are highly visible in the infrared spectrum while substantially imperceptible in the visible light spectrum and hence imperceptible to the human drivers, the driving assistance markings may be painted to significantly blend with their background in the visible light range while be significantly distinguishable from their background in the infrared spectral range. To this end the driving assistance markings may be painted using one or more infrared reflective paint materials which are characterized by two main characteristics.

First, the infrared reflective paint materials selected for painting the driving assistance markings must not significantly deviate from the color of the surface of the element(s) selected for painting the driving assistance markings. This means that the visible light reflected by the selected infrared reflective paint material(s) must not deviate by more than a certain (first) value (e.g. 10%, 15%, 20%, etc.) from the visible light spectrum reflected by the surface of the selected element(s).

In addition, the infrared reflective paint materials selected for painting the driving assistance markings must be significantly distinguishable from the surface of the selected element(s) in the infrared spectrum. This means that the infrared spectral range reflected by the selected infrared reflective paint material(s) must deviate by more than a certain (second) value (e.g. 25%, 30%, 35%, etc.) from the infrared spectral range reflected by the surface of the selected element(s).

Deviation in the reflection of light may be defined by a deviation in the values of one or more parameters and/or attributes of the reflected light, for example, amplitude, brightness, wavelength, color, and/or the like. This definition may apply for all spectral ranges discussed herein, specifically, the visible light spectral range and the IR spectral ranges, for example, NIR, SWIR, and/or the like.

While for brevity the paint material(s) selected for painting the driving assistance markings are designated infrared reflective paint materials, obviously, the deviation of the infrared reflective paint material(s) compared to their background material may be to both directions. This means that the paint material(s) used for painting the driving assistance markings may be more infrared reflective or more absorptive compared to the surrounding background of the markings, i.e., the surface of the selected element(s) on which the markings are painted. When the paint material(s) is more infrared reflective, the driving assistance markings will reflect more infrared light compared to their surrounding background and will be thus visible in the infrared spectrum range. When the paint material(s) is more infrared absorptive, i.e., less infrared reflective, the driving assistance markings will reflect less infrared light compared to their surrounding background and will be therefore also visible in the infrared spectrum range.

Optionally, the driving assistance markings may be painted in proximity, specifically closely around one or more visible road markings of one or more of the road segments, for example, lane separator markings, road side border line markings, pedestrian crossings, painted direction symbols, painted text and/or the like.

Painting the driving assistance markings using the infrared reflective paint materials and computing instructions thereof may present major advantages and benefits compared to currently existing methods and systems for applying road markings in roads.

First, while the human perception and recognition of road markings may be limited, the automated vehicular systems may have a significantly larger capacity for detecting and recognizing large volumes of road markings. These automated vehicular systems may therefore benefit from extensive additional driving assistance markings which may express and deliver increased volumes of information relating to the road segments and/or may provide increased, improved and/or enhanced assistance with vehicle control actions. However, in case the extensive road markings are visible as may be done using existing methods for applying road markings, the road markings may cause a major clutter which may significantly overload human drivers' perception which may lead to human mistakes potentially resulting in dangerous scenarios and increased risk on the road. In contrast, painting (applying) the additional driving assistance markings using the infrared reflective paint material(s) such that the driving assistance markings are imperceptible to the human drivers while visible to the infrared capable automated vehicular systems may overcome the clutter limitation while highly enhancing the assistance and support to the automated vehicular systems.

Moreover, existing (legacy) automated vehicular systems which similarly to the human drivers rely on visible light road markings may be also highly degraded in case the additional driving assistance markings are visible in the visible light spectrum. Such existing (legacy) automated vehicular systems may be limited in their ability to distinguish between extensive road markings painted in close proximity and all visible in the same light spectrum. On the other hand, the existing automated vehicular systems may be oblivious and unaware of the additional driving assistance markings which are only visible in the infrared spectrum thus prevent the overload and degradation in the operation of these legacy systems.

Furthermore, applying (painting) driving assistance markings in two different light spectrums, namely the visible light and the infrared spectrums may allow for increased detection and/or redundancy since the road markings, even identical markings, may be captured by imaging sensors in two distinct domains. The performance, for example, accuracy, robustness, reliability and/or certainty of the detection of the automated vehicular systems may be highly increased when relying on imagery data captured in both the visible light and infrared spectrums, typically by different imaging sensors. Moreover, visible light markings may be significantly undetectable under certain circumstances, for example, low illumination, large distance and/or the like. Relying on the infrared visible road markings may therefore enable the automated vehicular systems to operate with high performance in such scenarios.

In addition, distracting objects which are typically visible in the visible light spectrum, for example, spilled paint, trash and/or any other object that may be located on the road segment or in its close vicinity may be erroneously detected and/or interpreted by the automated vehicular systems as valid road markings which are visible in the visible light spectrum. Such degraded detection may result in potential erroneous detection that may lead to dangerous, critical and even fatal situation. Painting the driving assistance markings to be visible in the infrared spectrum, on the other hand, may significantly increase the detection performance, specifically robustness, reliability and/or reliability since infrared reflectance and/or absorption may be rare in naturally occurring objects such as the distracting objects thus making these naturally occurring objects significantly imperceptible in the infrared spectrum which may reduce and even completely prevent erroneous detection of these object as valid road markings.

Also, adding visible road markings (visible in the visible light spectrum) may be subject to regulation since they may affect the road conditions and perception as described herein before. Adding the infrared visible driving assistance markings on the other hand, may not be subject to any such regulation which may be highly costly, timely and/or demanding, since the additional road markings are imperceptible and practically invisible to the human drivers and/or to the existing automated vehicular systems configured to operate in the visible light spectrum.

Finally, painting the infrared visible driving assistance markings in proximity to visible road markings may significantly increase accuracy, robustness, reliability and/or certainty of the automated vehicular systems to detect of the driving assistance markings. Moreover, the automated vehicular systems may ignore and/or avoid erroneous interpretation of potential infrared reflective materials and/or sections of the road segment arbitrarily present in one or more of the road segments.

According to some embodiments of the present invention, the road markings, for example, the driving assistance markings may be enhanced by painting them using a composition comprising one or more (background) paint materials immersed with a plurality of IR retroreflective spherical elements configured to be highly visible in one or more of the IR spectral ranges, for example, NIR, SWIR and/or the like while significantly imperceptible in the visible light spectral range.

The IR retroreflective spherical elements may have reflection, absorption and/or retro-reflection (collectively designated reflection herein after) characteristics which are different in the IR and in the visible wavelengths. This different reflection characteristics and behavior in the IR wavelength range(s) compared to the visible wavelength range may make the surfaces painted with the paint containing the IR retroreflective spherical elements may be therefore highly detectable to IR based imaging sensors (e.g. IR camera. LiDAR, etc.) capable of capturing visual data in the infrared together with the visible range. At the same time, such surfaces may appear very similar to the background and/or nearby surfaces in the visible range. As such, human drivers and visible range imaging sensors may not sense the difference between the IR retroreflective spherical elements and their background surfaces. Human driving and/or ADAS and autonomous vehicle performance may therefore be unaffected by the IR retroreflective spherical elements.

In particular, due to their retroreflective characteristics, specifically having a reflective surface configured to reflect IR light, at least some of the IR retroreflective spherical elements protruding at least partially from the surface of the background paint material(s) may reflect significant IR light back in a direction of the IR light source from which the IR light originates making the IR retroreflective spherical elements highly efficient in reflecting directed light beams in substantially the same direction of the originating IR light source.

The IR retroreflective spherical elements immersed in the composition used to paint the driving assistance markings may therefore efficiently reflect directed IR light projected (emitted) by IR light source of vehicles, including, for example, the vehicles' headlights which may have some IR emission]. Specifically, the retroreflective spherical elements may reflect the directed IR light back towards the vehicles where one or more of the imaging sensors, specifically imaging sensors of the vehicles which are adapted to operate in the IR spectral range(s) may capture the reflected IR light. One or more of the automated vehicular systems may analyze the captured images to identify the driving assistance markings, extract driving information expressed by the driving assistance markings and operate accordingly.

Each of the plurality of IR retroreflective spherical elements may be may be produced of one or more one or more transparent materials which are at least partially transparent in the visible light spectral range and in one or more of the IR spectral ranges, for example, glass (e.g. silicate glass, etc.), Plexiglass (Poly-methyl methacrylate), polymer and/or the like. Moreover, in order to support their IR retroreflective characteristic, the IR retroreflective spherical elements may be shaped in one or more constructions having at least partially spherical shape, for example, a ball, an ellipsoid, a partial ball, a partial ellipsoid, a derivative of an ellipsoid and/or the like.

One or more methods, constructions and/or configurations may be applied to further support the IR retroreflective characteristic of the IR retroreflective spherical elements and make them retroreflective in one or more of the IR spectral ranges.

In a first exemplary embodiment, at least part of the curved surface of each IR retroreflective spherical element may be coated with one or more materials, specifically IR reflective materials characterized by two main characteristics: (1) reflect a substantial amount of light in one or more of the IR spectral ranges, and (2) transfer most of the light in the visible spectral range (400-700 nanometer). For example, the IR reflective material(s) may reflect more than a third value, for example, 25% of the light in the IR spectral range(s) and transfer more than a fourth value, for example, 70% of the light in the visible light spectral range.

Therefore, visible light projected on the IR retroreflective spherical elements protruding at least partially from the surface of the background paint material(s) may go through the IR reflective material(s) coating of the IR retroreflective spherical elements and may be reflected by one or more materials in the background of the IR retroreflective spherical elements, for example, the background paint material(s) in which the IR retroreflective spherical elements are immersed. The IR retroreflective spherical elements may be therefore significantly transparent in the visible spectral range and thus imperceptible while their background may be clearly visible. However, IR light projected on the IR retroreflective spherical elements may be significantly reflected by the IR reflective material(s) coating of the IR retroreflective spherical elements thus making the IR retroreflective spherical elements highly visible in the IR spectral range(s).

In a second exemplary embodiment, rather than coating at least part of the curved surface of the IR retroreflective spherical elements with IR reflective material(s) which are significantly transparent in the visible light spectral range, the IR retroreflective spherical elements may be coated with one or more IR reflective materials which are substantially similar to the background paint material(s) in the composition while highly reflective in one or more of the IR spectral ranges.

In such case, the IR retroreflective spherical element may be at least partially coated with one or more IR reflective materials characterized by two main characteristics: (1) reflect a substantial amount of light in one or more of the IR spectral ranges, and (2) reflect, in the visible spectral range, light substantially similar to the background paint material(s) of the composition. For example, the IR reflective material(s) may reflect more than the third value, for example, 25% of the light in the IR spectral range(s), for example, NIR, SWIR and/or the like while reflecting light deviating by less than a fifth value, for example, 25% from the light reflected by the background paint material(s) in the composition.

Therefore, in the visible light spectral range, the IR retroreflective spherical elements may reflect light which is substantially similar to the light reflected by the background paint material(s) in the composition thus making the immersed IR retroreflective spherical elements significantly imperceptible compared to their background paint material(s). However, when illuminated with IR light, specifically directed IR light (beams), the IR reflective material(s) coating of the IR retroreflective spherical elements may reflect significant IR light making the IR retroreflective spherical elements highly visible in the IR spectral range(s).

In a third exemplary embodiment, each of the IR retroreflective spherical elements may be produced from the transparent material(s) (e.g. silicate glass, Plexiglass, polymer, etc.) mixed with one or more pigments which are significantly transparent in one or more of the IR spectral ranges. The background paint material(s), on the other hand may be selected and/or configured to reflect a substantial amount of light in one or more of the IR spectral ranges such that the background paint material(s) may serve as the reflective surface. In the composition, at least some of the IR retroreflective spherical elements immersed in the background paint material(s) may partially protrude out of a surface of the background paint material(s).

As such, IR light going through the IR retroreflective spherical elements may reach the background paint material(s) and be reflected back. In particular, since the IR retroreflective spherical elements are protruding out of the background paint material(s), the background paint material(s) may reflect the IR light from the rear side of the IR retroreflective spherical elements thus resulting in retro reflection of the IR light beams in substantially the same direction from where they are projected.

Moreover, in order to make the IR retroreflective spheres significantly imperceptible in the visible light spectral range, the pigment(s) may be selected and/or configured to be substantially similar in the visible spectrum to the background paint material(s) in which the IR retroreflective spherical elements are immersed. The pigment(s) may be also generally absorptive in the whole visible spectral range, giving a slightly gray/black tint to the background paint.

In such case, the background paint material(s) may be characterized by reflecting a substantial amount of light in one or more of the IR spectral ranges while the pigment(s) mixed in the transparent material(s) to produce the IR retroreflective spherical element may be characterized by two main characteristics: (1) transfer most of the light in one or more of the IR spectral ranges, and (2) reflect visible light that is substantially similar to the background paint material(s) of the composition.

For example, the background paint material(s) may reflect more than a sixth value, for example, 25% of light in one or more of the IR spectral range(s), for example, NIR, SWIR and/or the like. In addition, the IR reflective material(s) may transfer more than a seventh value, for example, 70% of the light in the IR spectral range(s) while reflecting visible light that deviates by less than an eighth value, for example, 25% from the visible light reflected by the background paint material(s).

Using the IR retroreflective spherical elements to enhance driving assistance markings may present major advantages and benefits compared to currently existing methods and systems for applying road markings.

First, due to their highly efficient IR reflection, the IR retroreflective spherical elements may be highly visible in the IR spectral ranges thus making the IR retroreflective spherical elements and the driving assistance markings highly detectable to automated vehicular systems adapted to operate in one or more of the IR spectral ranges. However, while they may be highly beneficial to improve detection of the driving assistance markings by the automated vehicular systems operating in the IR spectral range(s), the IR retroreflective spherical elements, whether transparent and/or similar to their background paint material(s), may be highly imperceptible in the visible light spectrum thus preventing potential visual effects which may distract human drivers. For example, using visible light retroreflective elements as may be done by the existing methods may cause reflection of excessive light in the visible light range which may blind human drivers, at least temporarily, overload the driver's perception due to excessive visual clutter and/or the like.

Moreover, the IR retroreflective spherical elements may be used to encode new and/or additional information into the road segments appearance which may be used by the automated vehicular systems (e.g. ADAS, autonomous vehicle, etc.) while imperceptible to human drivers and/or legacy visible light based systems thus not effecting and/or distracting them.

Furthermore, as described herein before, background objects may often blend with the driving assistance markings in the visible light spectrum which may make the driving assistance markings undistinguishable from their background. However, in the infrared spectral range(s), the driving assistance markings enhanced with the IR retroreflective spherical elements may be highly distinguishable from natural occurring background objects which typically do not reflect substantial IR light.

In addition, using the IR retroreflective spherical elements to enhance the driving assistance markings may overcome limited detection and/or identification of the driving assistance markings under one or more environmental conditions, for example, low illumination, mist and/or the like which may significantly reduce detection of driving assistance markings visible only in the visible light spectrum as may be done by the existing methods.

Also, since IR retroreflective spherical elements are practically imperceptible in the visible light range, the driving assistance markings may be painted using compositions which may fully comply with regulations and/or directives applied worldwide for the driving assistance markings, specifically in the visible light spectrum.

Spherical elements are already in wide and common use for increasing visibility of road markings and are therefore approved for use after tested for compliance with regulations and/or requirements applied for driving surfaces with respect to one or more physical characteristics of the surface, for example, friction, anti-slip, anti-glare and/or the like. Therefore, since the IR retroreflective spherical elements may be produced similarly to the spherical elements which are already in use, the road markings painted using the composition of the background paint material(s) immersed with the IR retroreflective spherical elements may be also compliant with such driving surfaces regulations and/or requirements.

Finally, producing the IR retroreflective spherical elements by mixing the transparent material(s) with the pigment(s) rather than coating them with the IR reflective material(s) may further ensure that the road markings painted with the IR retroreflective spherical elements are compliant with the driving surfaces regulations and/or requirements. This is because the external coating of the coated IR retroreflective spherical elements may affect and possibly degrade one of more of the physical characteristics of the driving surface(s) painted with the coated IR retroreflective spherical elements, for example, reduce friction, increase slipping and/or skidding and/or the like. Using the IR retroreflective spherical elements having no external coating, on the other hand, may not affect and/or degrade the physical characteristics of the transparent material(s) used to produce both the already used spherical elements and the IR retroreflective spherical elements. It may also be more robust to abrasion over time, as vehicle tires and other liquids or debris pass over the road marks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing instructions for painting driving assistance marking using paint material(s) visible in the infrared spectrum while imperceptible in the visible light spectrum, according to some embodiments of the present invention.

An exemplary process 100 may be executed for computing instructions for painting driving assistance markings to support one or more automated vehicular systems, for example, an ADAS system, a vehicular monitoring system, a vehicular alert system, a vehicular control system and/or the like installed in one or more vehicles which may be fully manual with one or more alert systems, partially autonomous and/or fully autonomous.

Specifically, the driving assistance markings are painted on one or more elements of one or more road segments such that the driving assistance markings are highly visible in the infrared spectral range (e.g. NIR, SWIR) while significantly imperceptible and thus practically invisible in the visible light range. Imperceptible in the visible light spectrum, the driving assistance markings are therefore highly imperceptible by human drivers as well as to automated vehicular systems which are based in visible light imaging.

Automated vehicular systems which are capable of analyzing infrared spectrum images on the other hand may identify the driving assistance markings which may express informative and/or operation assistance information.

The imperceptible driving assistance markings may therefore provide additional driving assistance information beyond the traditional road markings which may be used by the infrared enabled vehicular systems while preventing visual clutter which may overload perception of the drivers and/or of the visual light spectrum based systems.

Figure 2:
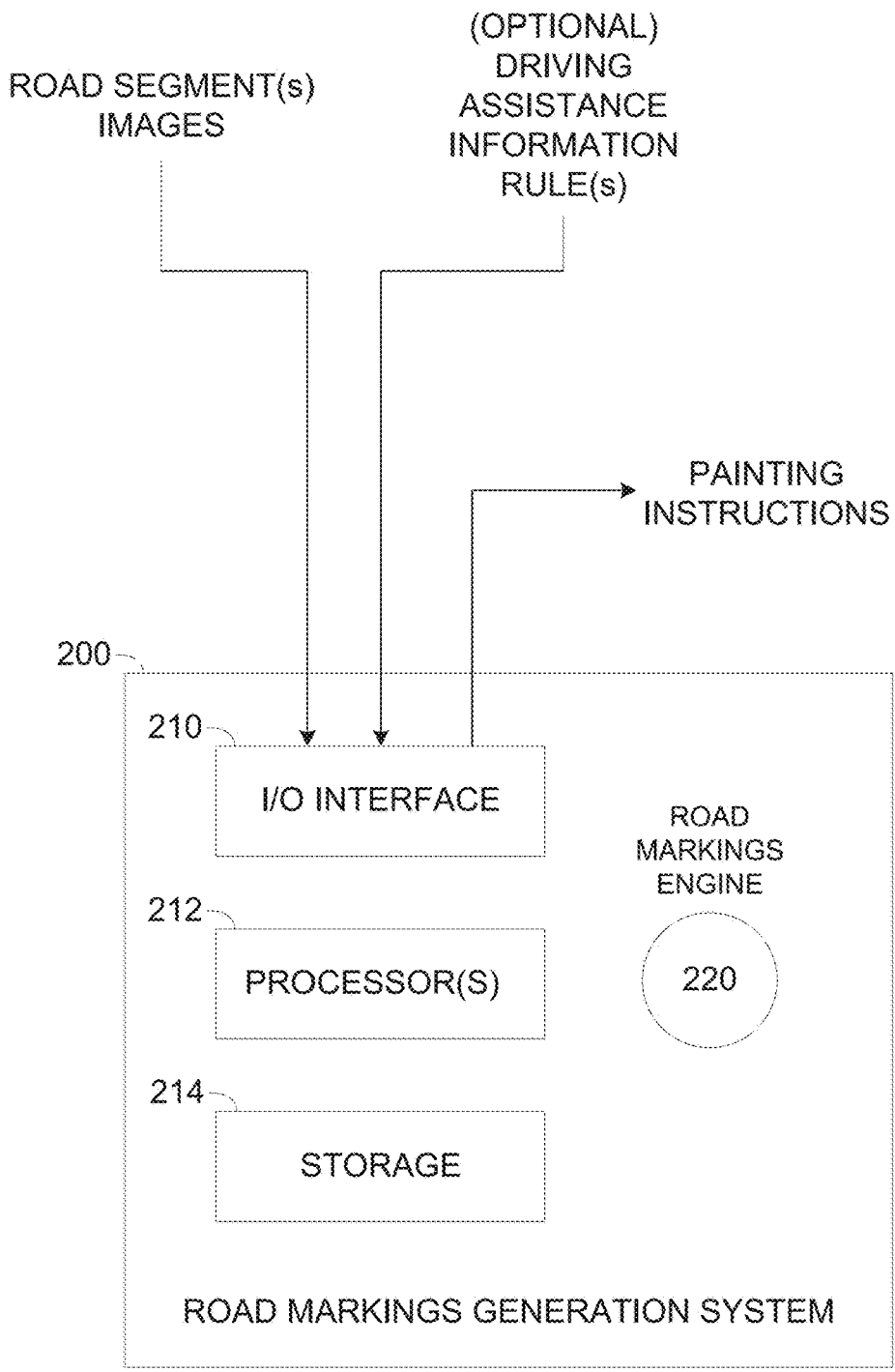
FIG. 2 is a schematic illustration of an exemplary system for computing instructions for painting driving assistance marking using paint material(s) visible in the infrared spectrum while imperceptible in the visible light spectrum, according to some embodiments of the present invention.

Reference is also made to FIG. 2, which is a schematic illustration of an exemplary system for computing instructions for painting driving assistance marking using paint material(s) visible in the infrared spectrum while imperceptible in the visible light spectrum, according to some embodiments of the present invention.

An exemplary road markings generation system 200, for example, a computer, a server, a processing node, a cluster of computing nodes and/or the like may be configured to execute a process such as the process 100 for computing instructions for painting driving assistance markings which are visible in in the infrared spectrum wile imperceptible in the visible light spectrum.

The road markings generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the road markings generation system 200 may obtain, for example, fetch, receive, acquire and/or the like one or more images of one or more road segments. For example, the road markings generation system 200 may connect to one or more of the networks, through the network interface(s) available in the I/O interface 210, to communicate with one or more networked resources storing one or more of the images. In another example, the road markings generation system 200 may access one or more attachable devices attached to interconnection interface(s) available in the I/O interface 210, for example, a USB storage device storing, capturing and/or recording one or more of the images.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the road markings generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a road markings engine 220 functional module for executing the process 100 to generate driving assistance markings and compute instructions for painting the driving assistance markings using one or more infrared visible paint materials such that the driving assistance markings are highly visible in the infrared spectrum while significantly imperceptible and potentially completely invisible in the visible light spectrum.

The road markings engine 220 may further output the painting instructions computed for painting the driving assistance markings using one or more of the infrared visible paint materials.

Optionally, the road markings engine 220 may receive one or more driving assistance information rules which may be applicable for one or more of the road segments.

Optionally, the road markings generation system 200, specifically the road markings engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by road markings engine 220 is described for computing instructions for painting driving assistance markings in a single road segment. This, however, should not be construed as limiting since the process 100 may be expanded for computing painting instructions for driving assistance markings in a plurality of road segments.

As shown at 102, the process 100 starts with the road markings engine 220 receiving one or more images of a road segment.

The image(s) may be captured at ground level, from an elevated location (e.g. building, poles, posts, etc.), from the air (e.g. by a drone, an aircraft, etc.), from space (satellite) and/or the like such that the road segment may be depicted from one or more elevation points and/or angles.

The road markings engine 220 may receive the image(s) from one or more sources. For example, one or more images may be retrieved from one or more data stores, for example, a database, a storage server, a storage service and/or the like which stores images depicting one or more road segments. In another example, one or more of the images may be received from one or more mapping services, for example, goggle earth, google street view and/or the like.

As shown at 104, the road markings engine 220 may generate driving assistance markings for the road segment, in particular the road markings engine 220 may generate the driving assistance markings based on analysis of the image(s) of the road segment.

The computed driving assistance markings are directed to support one or more automated vehicular systems of one or more vehicles riding through the road segment. Such automated vehicular systems may include, for example, one or more ADAS systems as known in the art configured to assist vehicle drivers. In another example, the automated vehicular systems may include one or more monitoring systems configured to monitor the environment of the vehicle and report, alert and/or otherwise indicate of one or more potential hazards, risks and/or conditions detected in the road segment. In another example, the automated vehicular systems may include one or more automatic vehicular control systems of one or more at least partially autonomous vehicles configured to control operation of the vehicle (e.g. break, maneuver, accelerate, etc.) based on one or more conditions, potential hazards and/or the like detected in the road segment.

Specifically, the driving assistance markings generated by the road markings engine 220 are intended to be added (painted) to the road segment such that the driving assistance markings are visible in the infrared spectrum, for example, NIR, SWIR and/or the like while significantly imperceptible in the visible light spectrum. The driving assistance markings are therefore directed to support automated vehicular systems which are capable of operating in the infrared spectrum, in particular, automated vehicular systems which integrate, employ, connect and/or communicate with one or more imaging sensors, for example, a camera, infrared camera, a thermal camera and/or the like adapted to operate in the infrared spectral range, for example, NIR, SWIR and/or the like.

The driving assistance markings generated by the road markings engine 220 may express driving information relating to the road segment. The driving information expressed by the driving assistance markings may include descriptive information relating to one or more transportation infrastructure objects located in the road segment as identified by analyzing the image(s), for example, a junction, a traffic light, a traffic sign, a pedestrian crossing, a bridge, a tunnel, a freeway and/or the like. For example, assuming there is a 4-way junction in the road segment with traffic lights and pedestrian crossings in all four directions. In such case, the road markings engine 220 may generate driving assistance markings which report the presence of the 4-way junction in the road segment. In particular, the road markings engine 220 may generate driving assistance markings which indicate the distance to the 4-way junction in the road segment, for example, the 4-way junction is 50 meters ahead, 30 meters ahead, 10 meters ahead and/or the like. In another example, assuming there is a sharp left curve in the road segment. In such case, the road markings engine 220 may generate driving assistance markings which report the presence of the sharp left curve in the road segment and may further configure the driving assistance markings to indicate the distance to the sharp left curve.

The driving assistance markings may further express driving information directed to assist one or more of the automatic vehicular control systems of at least one vehicle to conduct at least one control operation of the at least one vehicle. For example, assuming there is a sharp right curve in the road segment. In such case, the road markings engine 220 may generate orientation points road markings extending from a certain distance before the beginning of the right curve through the curve and until the curve end which may be used by the automatic vehicular control system(s) to accurately maneuver the respective vehicle(s) in the sharp curve. In another example, assuming there is a traffic light in the road segment. In such case, the road markings engine 220 may mark a stop line road markings right before the traffic light where vehicles must come to a complete stop. The stop line road markings may be used by as orientation points by the automatic vehicular control system(s) to identify the exact stop location and may control the vehicle(s) accordingly, apply breaks to fully stop the vehicle(s).

The driving assistance markings generated by the road markings engine 220 may express driving information similar to driving information expressed by visible road markings in the road segment which are visible in the visible light spectrum. This may of course be essential for supporting automatic vehicular control systems connected to imaging sensors which operated only in the infrared spectrum and hence monitor the surrounding of the vehicles in the infrared spectrum. However, duplicating the driving assistance markings may also serve for redundancy and/or to improve detection of the road markings in both the visible light spectrum and in the infrared spectrum for automatic vehicular control systems capable of monitoring the surrounding of the vehicle(s) in both the visible light and infrared spectrums.

However, the driving assistance markings generated by the road markings engine 220 may include and/or express additional driving information which is not expressed and/or available from the visible road markings. Traditionally, the road markings are directed for human drivers and are thus presented (painted, drawn, placed, etc.) to be visible in the visible light spectrum. The amount of information expressed by the road markings which may be efficiently consumed and comprehended by human drivers may be limited. The automatic vehicular control system(s) on the other hand may be able to acquire and process much larger volumes of driving information expressed by road markings. However, adding additional driving information visible to the human drivers may lead to major clutter which may overload perception and/or confuse the human drivers and may be therefore inefficient and potentially dangerous. Expressing the additional driving information via the infrared visible driving assistance markings may therefore overcome this limitation since the driving assistance markings are substantially and potentially completely imperceptible to the human drivers while visible to the infrared capable automatic vehicular control system(s) which may use the additional driving information.

The driving assistance markings may include human readable markings which may be identified and recognized by automatic vehicular control system(s) designed, configured and/or adapted to rely on road markings directed for human drivers. However, the driving assistance markings may further include markings, signs, symbols, expressions and/or the like which are directed for machines and may thus not be comprehended by humans, for example, coded data (e.g. barcode, QR code, etc.), machine language symbolic data and/or the like. While incomprehensible by humans, automatic vehicular control system(s) configured accordingly may be of course able to identify, decipher and use such machine directed driving assistance markings.

Optionally, the road markings engine 220 may generate driving assistance markings which are applied in the (current) road segment but may relate to one or more transportation infrastructure objects located in one or more subsequent road segments located after the (current) road segment. For example, assuming there is a mountain tunnel one mile ahead of the (current) road segment. Further assuming that one or more automatic vehicular control system(s) include radar sensors highly suitable for low and/or no illumination imaging. In such case, the automatic vehicular control system(s) may bring the radar sensors online and/or test them prior to entry into the tunnel.

Optionally, the road markings engine 220 may compute one or more of the driving assistance markings according to one or more of the driving assistance information rules which may be received from one or more sources.

The driving assistance information rules may include one or more general rules applicable for a plurality of road segments sharing one or more parameters and/or attributes. For example, a certain general driving assistance information rule may indicate that each road segment which comprises a pedestrian crossing should include driving assistance markings at one or more locations preceding the pedestrian crossing (e.g. 100 meters, 50 meters, 15 meters, etc.) to inform of the upcoming pedestrian crossing. In another example, a certain general driving assistance information rule may indicate that driving assistance markings should be included in each road segment to indicate a maximum speed allowed in the respective road segment. In another example, a certain general driving assistance information rule may indicate that curve orientation points driving assistance markings should be included in each road segment comprising one or more curves exceeding a certain curve angle, for example, 10 degrees, 15 degrees, 25 degrees and/or the like.

However, the driving assistance information rules may also include one or more specific rules applicable for one or more specific road segments. For example, a certain specific driving assistance information rule may indicate that special driving assistance markings should be applied in the road segment in case the specific road segment includes a traffic circle immediately followed by another traffic circle within less than a certain distance, for example, 50 meters, 80 meters and/or the like. The special driving assistance markings which may be applied before the first circle may express the multiple traffic circles which may require some special attention by tone or more of the automatic vehicular control systems.

As shown at 106, the road markings engine 220 may analyze the image(s) of the road segment to identify and select one or more elements of the road segment which are suitable for applying (painting) the driving assistance markings generated for the road segment.

The elements on which the driving assistance markings may be painted nay include, for example, one or more surface sections of the road segment, one or more colored marks painted on the road segment, one or more infrastructure objects located in proximity to the road segment (e.g., next to, on, above, etc.) and/or the like. The colored marks painted on the road segment may include visible road markings such as, for example, lane separator markings, road side border line markings, pedestrian crossings, painted direction symbols (e.g., arrows, stop lines, etc.), painted text (e.g. stop, slow, etc.) and/or the like. The infrastructure objects may include, for example, pavement edges, traffic poles, traffic lights, structures wall and/or the like.

Figure 3A:
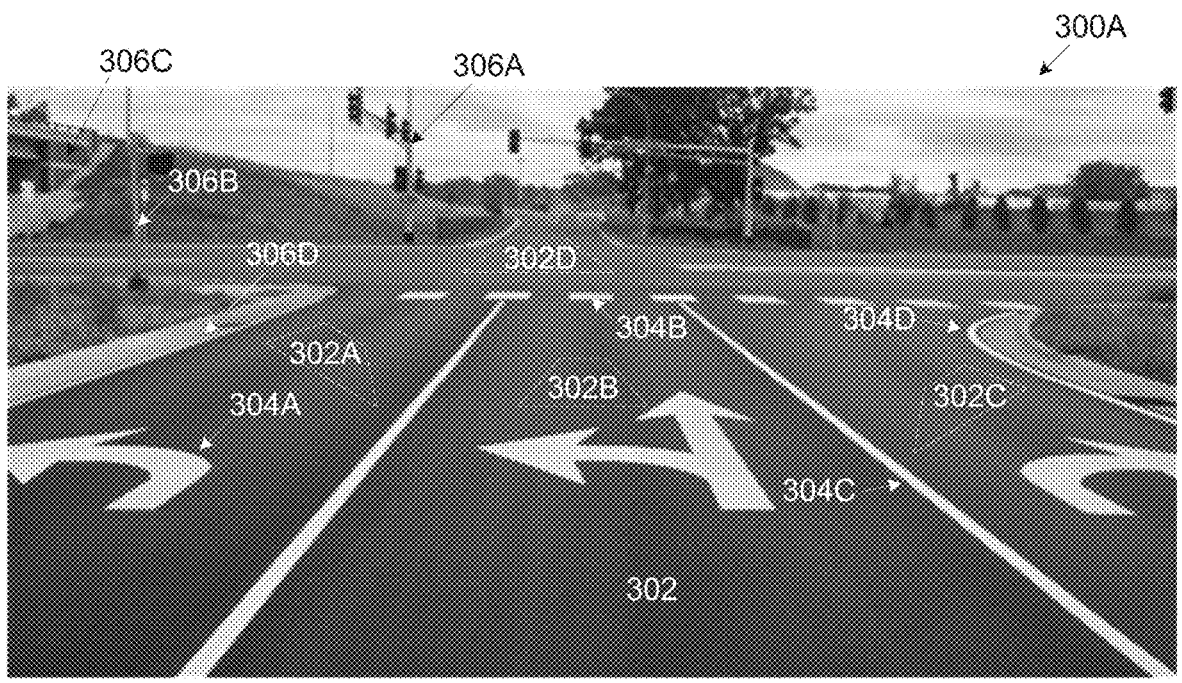
FIG. 3A and FIG. 3B are exemplary road segments comprising elements suitable for painting driving assistance marking painted using paint material(s) visible in the infrared spectrum while imperceptible in the visible light spectrum, according to some embodiments of the present invention.
Figure 3B:

Reference is now made to FIG. 3A and FIG. 3B, which are exemplary road segments comprising elements suitable for painting driving assistance markings painted using paint material(s) visible in the infrared spectrum while imperceptible in the visible light spectrum, according to some embodiments of the present invention.

An exemplary road segment 300A may comprise a plurality of elements which may be identified by a road markings engine such as the road markings engine 220 as suitable for applying (painting) the driving assistance markings generated for the road segment. For example, the road markings engine 220 analyzing one or more images of the road segment 300A may identify one or more surface sections 302 of the road segment 300A which may be suitable for painting the driving assistance markings, for example, surface section 302A, 302B, 302C and/or 302D. In another example, the road markings engine 220 analyzing one or more images of the road segment 300A may identify one or more visible road markings 304 painted in the road segment 300A which may be suitable for painting the driving assistance markings, for example, an arrow marking 304A, a pedestrian crossing marking 304B a lane separator line 304C and and/or a road border line 302D. In another example, the road markings engine 220 analyzing one or more images of the road segment 300A may identify one or more infrastructure object 306 of the road segment 300A which may be suitable for painting the driving assistance markings, for example, a traffic light pole 306A, a lighting pole 306B, a wall of a bridge 306C and/or a sidewalk surface 306D.

An exemplary road segment 300B may also comprise a plurality of elements which may be identified by the road markings engine 220 as suitable for applying (painting) the driving assistance markings generated for the road segment. For example, the road markings engine 220 analyzing one or more images of the road segment 300B may identify one or more visible road markings 304 painted in the road segment 300B which may be suitable for painting the driving assistance markings, for example, a road border line 302D. In another example, the road markings engine 220 analyzing one or more images of the road segment 300B may identify one or more infrastructure object 306 of the road segment 30BA which may be suitable for painting the driving assistance markings, for example, a side barrier rail 306E.

The road markings engine 220 may therefore analyze the image(s) to identify one or more elements in the road segments which may be suitable for painting the generated driving assistance markings. In particular, the road markings engine 220 may select one or more of the identified elements according to the generated driving assistance markings.

For example, assuming the road segment comprises a pedestrian crossing and the road markings engine 220 generated driving assistance markings accordingly to indicate the presence of the pedestrian crossing and further indicate a distance to the pedestrian crossing. In such case, the road markings engine 220 may select one or more visible road markings, for example, lane separator lines for applying (painting) the driving assistance markings. In particular, the road markings engine 220 may select one or more lane separator lines and/or line sections which are located at the distance from the pedestrian crossing as indicated by the respective driving assistance markings. For example, assuming three driving assistance markings are generated to indicate the pedestrian crossing is 10, 30 and 50 meters ahead. In such case, the road markings engine 220 may select three lane separator lines and/or line sections located at 10, 30 and 50 meters before the pedestrian crossing on which the respective driving assistance markings may be painted.

In another example, assuming the road segment comprises a junction and the road markings engine 220 generated driving assistance markings accordingly to indicate the presence of the junction. In such case, the road markings engine 220 may select one or more road surfaces of the road segment for applying (painting) the driving assistance markings indicating the upcoming junction. For example, the road markings engine 220 may select a plurality of consecutive surface sections of the road segment for painting decrementing distance values to the junction.

In another example, assuming the road segment comprises a railroad intersection and the road markings engine 220 generated driving assistance markings accordingly to indicate the presence of the railroad intersection. In such case, the road markings engine 220 may select one or more infrastructure objects, for example, a slowdown traffic sign pole for applying (painting) the driving assistance markings indicating the upcoming railroad intersection.

Moreover, the road markings engine 220 may adjust one or more of the driving assistance markings according to the selected element(s) on which the driving assistance markings generated for the road segment are to be painted. For example, assuming the road markings engine 220 selects a traffic pole located 45 meters before an intersection for painting driving assistance markings indicative of the intersection, the road markings engine 220 may adjust and/or generate the driving assistance markings which are to be applied on the traffic pole to indicate that the intersection is 45 meters ahead. In another example, assuming the road markings engine 220 selects a series of lighting poles distributed along a sharp curve for applying (paining) orientation points driving assistance markings to assist the automatic vehicular control systems to maneuver the vehicles along the curve. In such case, the road markings engine 220 may adjust the size of the orientation points to fit the lighting poles while ensuring high visibility of the orientation points.

As shown at 108, the road markings engine 220 may analyze one or more of the surfaces of one or more of the selected element(s) on which the driving assistance markings generated for the road segment are to be painted. In particular, the road markings engine 220 may analyze the image(s) of the road segment to identify a color of the surface(s) of the selected element(s) and more specifically to identify the spectral range of visible light reflected by the surface(s) of the selected element(s).

For example, assuming the road markings engine 220 selects a certain road surface section of the road segment for applying the driving assistance markings, the road markings engine 220 may identify that the road surface section is a black asphalt surface which accordingly reflects visible light in a spectral range corresponding to black color. In another example, assuming the road markings engine 220 selects a certain road marking of the road segment for applying the driving assistance markings, the road markings engine 220 may identify that the road marking is painted white and thus reflects visible light in a spectral range corresponding to white color. In another example, assuming the road markings engine 220 selects a certain traffic pole of the road segment for applying the driving assistance markings, the road markings engine 220 may identify that the traffic pole is painted and/or coated with gray paint and thus reflects visible light in a spectral range corresponding to gray color.

As shown at 110, the road markings engine 220 may select one or more paint materials for applying (painting) the driving assistance markings generated for the road segment on the selected element(s) of the road segment.

Specifically, the road markings engine 220 may select infrared reflective paint material(s) which reflect infrared light in one or more infrared spectral ranges, for example, NIR (750-1400 nm), SWIR (1400-3000 nm) and/or the like and are further characterized by two main characteristics.

First, each of the selected paint materials may reflect light in the visible light spectral range which is substantially similar to the visible light spectral range of the surface(s) of the selected object(s) on which the driving assistance markings are to be applied. Specifically, each paint material selected for painting the driving assistance markings may deviate by less than a first value from the visible light spectral range reflected by the respective surface of the respective element. The first value, for example, 15%, 20%, 25% and/or the like may be set to ensure that the selected paint material(s) is not substantially visible in the visible light spectrum when painted on the selected element(s).

Second, each of the selected paint materials may reflect light in the infrared spectral range which is substantially different from the infrared spectral range of the surface(s) of the selected object(s) on which the driving assistance markings are to be applied. Specifically, each paint material selected for painting the driving assistance markings should deviate by more than a second value from the infrared spectral range reflected by the respective surface of the respective element. The second value, for example, 25%, 30%, 35% and/or the like may be set to ensure that the selected paint material(s) is substantially visible in the infrared light spectrum when painted on the selected element(s).

Deviation in the reflection of light may be defined by a deviation in the values of one or more parameters and/or attributes of the reflected light, for example, amplitude, brightness, wavelength, color, and/or the like. This definition may apply for all spectral ranges discussed herein, specifically, the visible light spectral range and the IR spectral ranges, for example, NIR, SWIR, and/or the like.

For brevity the paint material(s) selected for painting the driving assistance markings are designated infrared reflective paint materials. However, the deviation in the reflectance of infrared light may be to both directions, meaning that the paint material(s) selected for painting the driving assistance markings may be more infrared reflective or more absorptive compared to the surrounding background of the markings, i.e., the surface of the selected element(s) on which the markings are painted. As such, when the selected infrared reflective paint material(s) is more infrared reflective, the driving assistance markings will reflect more infrared light compared to their surrounding background and will be thus visible in the infrared spectrum range. Never the less, when the selected infrared reflective paint material(s) is more infrared absorptive (less infrared reflective), the driving assistance markings will reflect less infrared light compared to their surrounding background and will be also visible in the infrared spectrum range.

For example, assuming the road markings engine 220 selects a certain black asphalt road surface section of the road segment for applying the driving assistance markings. Further assuming that while the black asphalt road surface does not significantly reflect light in the visible light spectral range, the black asphalt road surface reflects infrared light in a spectral range of, for example, less than 800 nm. In such case the road markings engine 220 may select a paint material which does not deviate from the black asphalt color by more than, for example, 20% meaning that it does not reflect more than 20% of the visible light while significantly deviating, for example, by 25% from black asphalt color in the infrared spectral range, meaning that it reflects infrared light in a range of more than 1000 nm for example.

In another example, assuming the road markings engine 220 selects a certain white road marking of the road segment for applying the driving assistance markings. Further assuming that while the white road marking reflects most and possible all light in the visible light spectral range, the white road marking reflects infrared light in a spectral range of, for example, less than 950 nm. In such case the road markings engine 220 may select a paint material which does not deviate from the white road marking by more than, for example, 20% meaning that it reflects more that 80% of the visible light while significantly deviating, for example, by 25% from white road marking in the infrared spectral range, meaning that it reflects infrared light in a range of more than 1200 nm for example.

Figure 4:
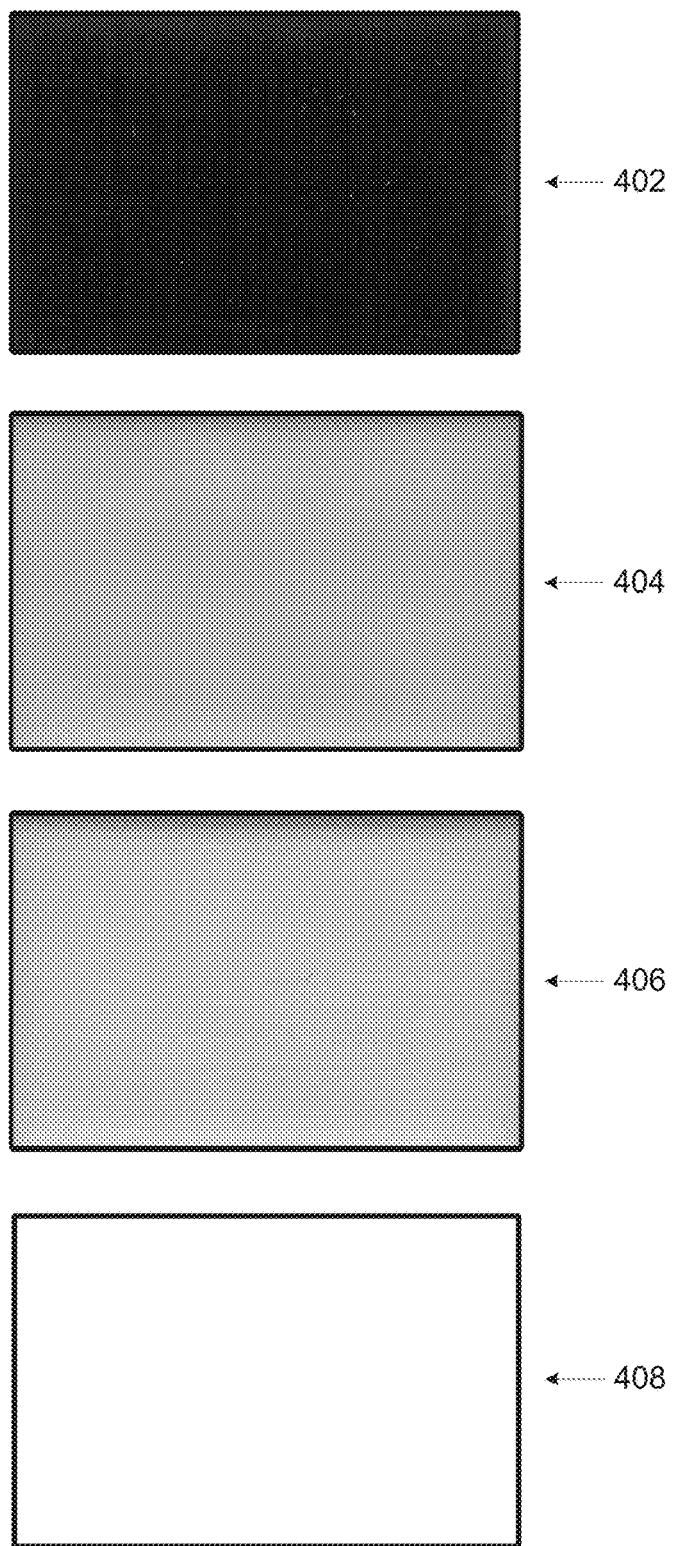
FIG. 4 presents color blends of an exemplary infrared reflective paint material(s) visible in the infrared spectrum while imperceptible in the visible light spectrum used for painting imperceptible driving assistance markings, according to some embodiments of the present invention.

Reference is now made to FIG. 4, presents color blends (mixtures) of an exemplary infrared reflective paint material(s) visible in the infrared spectrum while imperceptible in the visible light spectrum used for painting driving assistance markings, according to some embodiments of the present invention.

Assuming a road markings engine such as the road markings engine 220 selects a certain infrared reflective paint material seen in 402 which is characterized by a significantly dark color for painting driving assistance markings generated for a certain road segment. Further assuming the road markings engine 220 selects to paint the driving assistance markings on a certain element of the certain road segment which is characterized by a white color as seen in 408. In such case, the road markings engine 220 may determine that the certain infrared reflective paint material should be mixed with one or more other paint materials, for example, a white paint material to ensure that the certain infrared reflective paint material does not deviate from the color of the certain element painted white by more than the first value (e.g., 20%). The road markings engine 220 may compute one or more mixture ratios for mixing the certain infrared reflective paint material such that the color of the mixed infrared reflective paint material does not deviate by more than the first value form the white color of the surface of the certain element. A mixture at a ratio of 1:4 between the certain infrared reflective paint material and the white paint material is seen in 404 and a mixture at a ratio of 1:9 between the certain infrared reflective paint material and the white paint material is seen in 406.

As shown at 112, the road markings engine 220 may compute instructions for painting the driving assistance markings generated for the road segment on the selected element(s) using the selected paint material(s).

For example, the painting instructions may indicate a location, a position, an orientation, an elevation and/or the like for painting the driving assistance markings on the selected element(s). In another example, the painting instructions may indicate a size, a spacing and/or the like of the painted driving assistance markings.

Moreover, the painting instructions may define mixing one or more of the selected inferred reflective paint materials with one or more other paint materials and/or dilution substances to achieve and comply with the two characteristics of the paint material used to paint the driving assistance markings. Namely, these two characteristics, as described herein before, are deviation of less than the first value (e.g., 20%) from the visible light spectral range reflected by the surface of the respective element and deviation of more than the second value (e.g., 25%) from the infrared spectral range reflected by the surface of the respective element. The painting instructions may therefore define a concentration of each of the paint materials in the mixture, a volume of each paint materials in the mixture, one or more dilution materials and/or the like.

Optionally, the road markings engine 220 computes instructions for painting one or more of the driving assistance markings on the selected element(s) in close proximity, specifically closely around one or more visible road markings, for example, lane separator markings, road side border line markings, pedestrian crossings, painted direction symbols (e.g., arrows, stop lines, etc.), painted text (e.g. stop, slow, etc.) and/or the like. For example, the road markings engine 220 may compute instructions for painting one or more of the driving assistance markings next to lane separator lines markings. In another example, the road markings engine 220 may compute instructions for painting one or more of the driving assistance markings around one or more direction arrow markings. Painting the infrared visible driving assistance markings in proximity to the visible road markings may enable the automated vehicular systems to more easily detect, identify and/or recognize the infrared visible driving assistance markings. In particular, since the infrared visible driving assistance markings are located in proximity to the visible road markings, the automated vehicular systems may not erroneously interpret arbitrary infrared reflective materials and/or sections of the road segment as the infrared visible driving assistance markings.

The road markings engine 220 may compute the instructions for painting the driving assistance markings using the infrared reflective paint material(s) on existing painted surfaces of the selected element(s) of the road segment. For example, assuming there are lane separator line markings painted in at least part of the road segment, the road markings engine 220 may compute the instructions for painting the driving assistance markings using the infrared reflective paint material(s) on the existing lane separator line markings and/or part thereof. In another example, assuming there are one or more painted traffic poles and/or traffic light poles in the road segment, the road markings engine 220 may compute the instructions for painting the driving assistance markings using the infrared reflective paint material(s) on one or more of the painted poles.

However, the road markings engine 220 may compute the instructions for painting the driving assistance markings using the infrared reflective paint material(s) in conjunction with one or more other paint materials used to paint the surface(s) of the selected element(s). For example, the road markings engine 220 may compute instructions for painting one or more visible road markings, for example, lane operator lines, pedestrian crossing, direction symbols and/or the like using one or more visible light paint materials, for example, white paint. The road markings engine 220 may further compute instructions for using the infrared reflective paint material(s) to paint the driving assistance markings over one or more of the newly painted white road markings. In another example, the road markings engine 220 may compute instructions for painting one or more traffic poles located in the road segment using one or more visible light paint materials, for example, gray paint. The road markings engine 220 may further compute instructions for using the infrared reflective paint material(s) to paint the driving assistance markings over the one or more of the newly painted poles.

As shown at 114, the road markings engine 220 may output the painting instructions computed for painting the driving assistance markings on one or more of the elements of the road segment using one or more of the infrared visible paint materials The road markings engine 220 may output the painting instructions in one or more formats. For example, the painting instructions may be generated and configured accordingly to instruct one or more workers to manually apply the infrared visible paint(s). in another example, the painting instructions may be directed and configured accordingly for one or more automated painting systems, apparatuses and/or devices configured to apply automatically the infrared visible paint(s) to paint.

Figure 5:
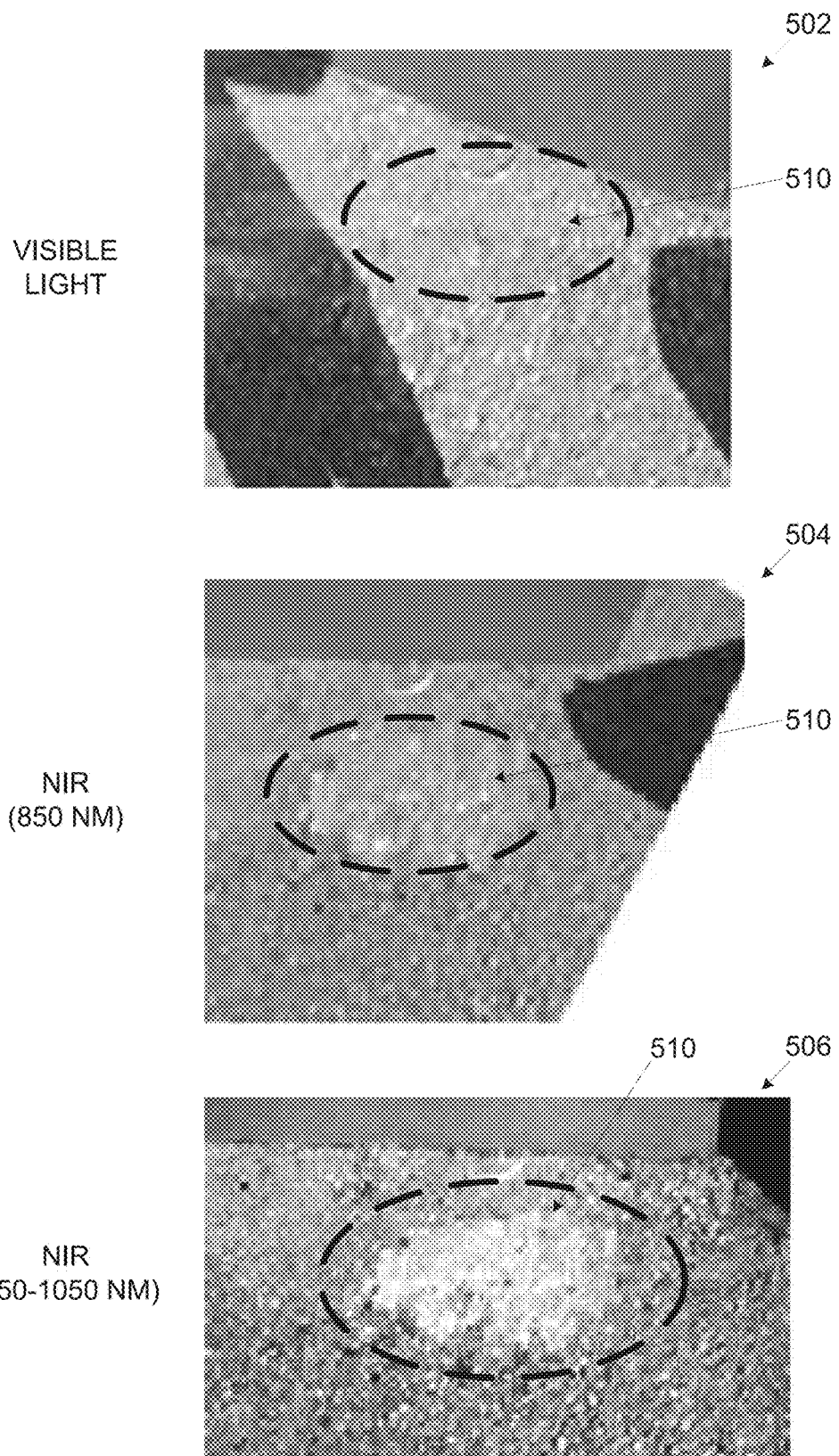
FIG. 5 presents images of a road section painted with an exemplary paint material(s) visible in the infrared spectrum while imperceptible in the visible light spectrum used for painting driving assistance markings, according to some embodiments of the present invention.

Reference is now made to FIG. 5, which presents images of a road section painted with an exemplary paint material(s) visible in the infrared spectrum while imperceptible in the visible light spectrum used for painting driving assistance markings, according to some embodiments of the present invention.

As seen in 502 which is an image of an exemplary certain road section captured in visible light spectral range, a certain mark 510 is almost imperceptible since it is painted using an exemplary infrared reflective paint material which does not significantly deviate from the color (visible light spectral range) of the certain road section.

As seen in 504, which is an image of the certain road section captured in NIR infrared spectral range, specifically at 850 nm, the certain mark 510 is slightly more visible since the exemplary infrared reflective paint material deviates to some extent from the infrared spectral range of the certain road section. However, the deviation may be insufficient, i.e., less than the second value (e.g. 25%) such that it may be significantly difficult to distinguish the certain mark 510 from its surrounding road section even in the 850 nm spectral range.

As seen in 506, which is an image of the certain road section captured in higher NIR infrared spectral range, specifically at 850-1050 nm, the certain mark 510 is highly visible since the exemplary infrared reflective paint material significantly deviates from the infrared spectral range of the certain road section, specifically by more than the second value (e.g. 25%).

According to some embodiments of the present invention the road markings generation system 200, specifically the road markings engine 220 may be integrated and/or executed by one or more painting systems, apparatuses and/or devices configured to apply automatically one or more of the infrared reflective paint materials for painting the infrared visible driving assistance markings on one or more elements in one or more road segments.

Such painting systems, apparatuses and/or devices, collectively designated automated painting systems herein after, may be equipped with one or more paint applying elements as known in the art, for example, a sprayer, a brush, a dispenser and/or the like which are controllable by one or more controllers and/or processors of the automated painting systems.

The road markings engine 220 executed by one or more of the automated painting systems may therefore execute the process 100 to compute the instructions for painting the driving assistance markings generated for one or more road segments on one or more elements of the respective road segments using one or more of the infrared reflective paint materials.

Specifically, one or more of the automated painting systems may be equipped with one or more imaging sensors, for example, a camera, infrared camera, a thermal camera and/or the like configured to capture one or more images of the road segment(s) in particular of one or more of the elements of the road segment(s). The road markings engine 220 may analyze the images, specifically the elements' surface(s) to identify their color and select the infrared reflective paint material(s) accordingly as described in the process 100.

After computing the painting instructions, the road markings engine 220 may operate one or more of the paint applying elements of the respective automated paining system to automatically apply the infrared reflective paint materials in order to paint the infrared visible driving assistance markings. In other embodiments, the road markings engine 220 may provide the painting instructions to one or more other functional modules (e.g. software module, hardware element and/or a combination thereof) executed by the automated painting system.

Optionally, one or more of the automated paining systems may be further configured to apply visible paint to paint road markings using one or more visible paint materials which are visible in the visible light spectrum. Such automated paining systems may optionally paint the infrared visible driving assistance markings using the selected infrared reflective paint material(s) while painting the visible road markings using the visible paint material(s).

According to some embodiments of the present invention, the road markings, specifically the driving assistance markings may be painted using a composition comprising one or more (background) paint materials immersed with a plurality of IR retroreflective spherical elements configured and produced to reflect a significant amount of IR light back in a direction of the IR light source from which the IR light originates.

Each of the plurality of IR retroreflective spherical elements may be shaped in one or more constructions having at least partially spherical shape, for example, a ball, an ellipsoid, a partial ball, a partial ellipsoid, a derivative of an ellipsoid and/or the like.

Moreover, each IR retroreflective spherical element may be at least partially transparent in the visible light spectral range as well as in one or more of the IR spectral ranges, for example, NIR, SWIR and/or the like. The IR retroreflective spherical elements may be therefore produced of one or more at least partially transparent materials, for example, glass (e.g. silicate glass, etc.), Plexiglass, polymer and/or the like.

However, at least part of the curved surface of each IR retroreflective spherical element may be coated with one or more materials, specifically IR reflective materials characterized by two main characteristics: (1) reflect a substantial amount of light in one or more of the IR spectral ranges, and (2) transfer most of the light in the visible spectral range (400-700 nanometer). For example, the IR reflective material(s) may reflect more than a third value, for example, 25% of the light in the IR spectral range(s) and transfer more than a fourth value, for example, 70% of the light in the visible light spectral range.

At least some of the plurality of IR retroreflective spherical elements may protrude at least partially out of the surface of the background paint materials(s) in which they are immersed.

Therefore, visible light projected on the IR retroreflective spherical elements may go through the coating IR reflective material(s) and may be reflected by one or more materials in the background of the IR retroreflective spherical elements, for example, the background paint material(s) in which the IR retroreflective spherical elements are immersed. As such, in the visible light the IR retroreflective spherical elements may be significantly transparent and thus imperceptible while their background may be easily and/or clearly visible. However, IR light projected on the IR retroreflective spherical elements may be significantly reflected thus making the IR retroreflective spherical elements highly visible in the IR spectral range(s).

Figure 6A:
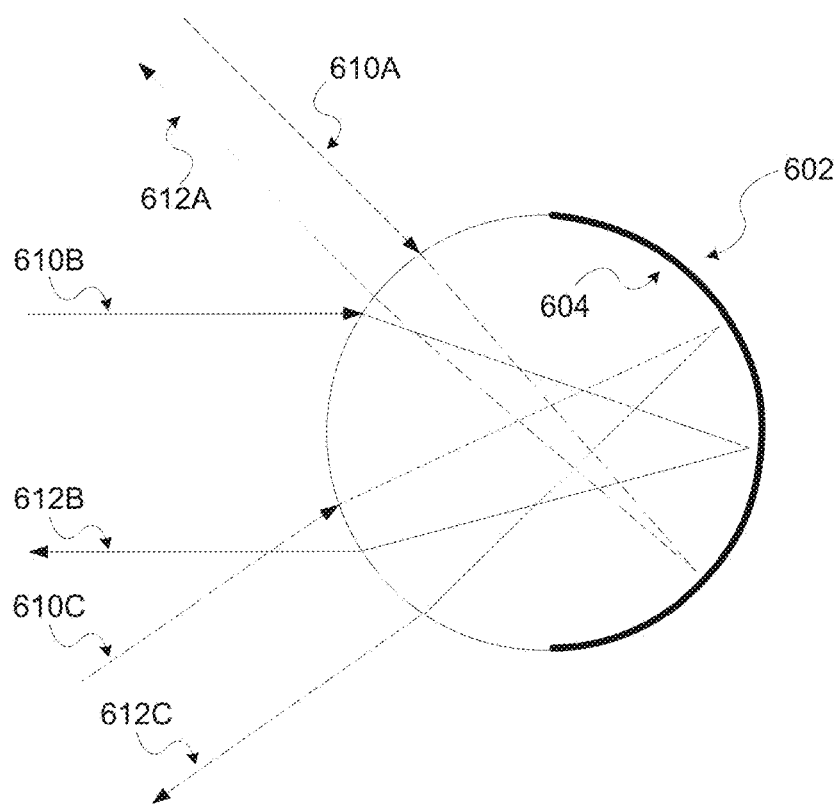
FIG. 6A and FIG. 6B are schematic illustrations of an exemplary IR retroreflective spherical element configured to reflect an incoming IR light beam in a direction substantially parallel to the incoming IR beam for enhancing road markings, according to some embodiments of the present invention.
Figure 6B:
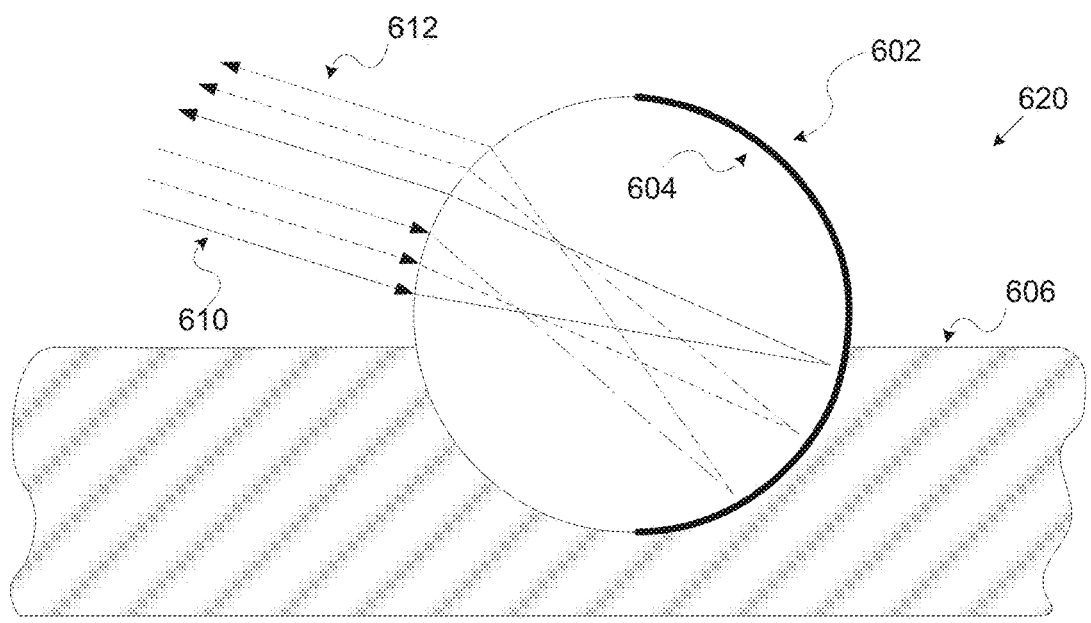

Reference is now made to FIG. 6A and FIG. 6B, which are schematic illustrations of an exemplary IR retroreflective spherical element used configured to reflect an incoming IR light beam in a direction substantially parallel to the incoming IR beam for enhancing road markings, according to some embodiments of the present invention.

As seen in FIG. 6A, an exemplary IR retroreflective spherical element 602 constructed of a refracting optical element which is at least partially transparent having a reflective surface 604 coating at least part of its surface may reflect incoming light beams in substantially the same direction of the incoming light beams as known in the art. For example, an incoming light beam light 610A may be reflected by the reflective surface 604 in an outgoing light beam 612A, an incoming light beam light 610B may be reflected by the reflective surface 604 in an outgoing light beam 612B A and an incoming light beam light 610C may be reflected by the reflective surface 604 in an outgoing light beam 612C.

In particular, the refracting optical element of the IR retroreflective spherical element 602 may be configured, selected and/or produced to be at least partially transparent in both the visible light range and in one or more of the IR spectral light ranges, for example, NIR, SWIR and/or the like. Moreover, the reflective surface 604 coating at least part of the surface of the at least partially transparent refracting optical element of the IR retroreflective spherical element 602 may be constructed of one or more IR reflective materials configured, selected and/or produced to reflect a significant amount of the IR light heating the reflective surface 604 while transferring most of the visible light heating the reflective surface 604. Specifically, the reflective surface 604 may reflect more than the third value (e.g. 25%) of the light in the IR spectral range(s) and transfer more than the fourth value (e.g. 70%) of the light in the visible light spectral range.

Typically, the reflective surface 604 may be applied on an exterior curved surface of each of the plurality of IR retroreflective spherical elements 602. However, the reflective surface 604 may be optionally applied on an inner curved surface of one or more of the plurality of IR retroreflective spherical element 602.

The IR retroreflective spherical element 602 may be therefore significantly imperceptible in the visible light range while highly visible in one or more of the IR spectral light ranges. Moreover, while the IR retroreflective spherical element 602 may be visible when illuminated with in general non-directed IR light, the IR retroreflective spherical element 602 may become significantly more visible when illuminated with in directed IR light beams.

As seen in FIG. 6B, the IR retroreflective spherical element 602 may be immersed in one or more background paint materials 606 to create a composition 620 which may be used to paint road markings, specifically driving assistance markings in one or more road segments.

After the composition 620 is applied on the road segment(s), the immersed IR retroreflective spherical element 602 may partially protrude out of a surface of the composition 620. The protruding IR retroreflective spherical element 602 may therefore reflect incoming IR light beams 610 thus creating outgoing IR light beams 612 which are substantially parallel to the incoming IR light beams 610 and are thus directed towards the light source of the incoming IR light beams 610.

The plurality of IR retroreflective spherical elements 602 may be distributed in the background paint material(s) 606 in random orientation such that their concave coated surface may face random directions. However, since the number of IR retroreflective spherical elements 602 immersed in the background paint material(s) 606 may be extremely large, despite the random orientation, statistically, a significantly large number of IR retroreflective spherical elements 602 may be oriented in the composition 620 with their concave coated surface facing an exterior surface of the composition 620 and thus facing outwards of the composition 620. As such, incoming IR light beams 610 directed at these IR retroreflective spherical elements 602 may be reflected by their concave reflective surface 604.

Optionally, the plurality of IR retroreflective spherical elements 602 may be distributed in the background paint material(s) 606 in directed orientation with their concave reflective surface 604, i.e. their concave surface coated with the IR reflective material(s), facing a common direction towards the exterior surface of the composition 620.

Randomly distributing the IR retroreflective spherical elements 602 in the background paint material(s) 606 may significantly simplify the production process of the composition 620 since there is no need to orient each of the IR retroreflective spherical elements 602 before immersing them in the background paint material(s) 606. This may significantly reduce production time, production means (e.g. machinery, pick and place equipment, imaging equipment, etc.), effort and/or the like.

The plurality of IR retroreflective spherical elements 602 immersed in the background paint material(s) 606 to create the composition 620 used to paint the driving assistance markings may therefore effectively reflect directed incoming IR light and may therefore efficiently enhance the driving assistance markings to support one or more automated vehicular systems of one or more vehicles adapted to operate in one or more of the infrared spectral ranges. Specifically, the plurality of immersed IR retroreflective spherical elements 602 may effectively reflect directed incoming IR light beams 610 projected by one or more light sources of one or more of the vehicles and create outgoing IR light beams 612 which may be captured by one or more imaging sensors of the vehicles which are adapted to operate in the infrared spectral range, for example, NIR, SWIR and/or the like.

One or more of the automated vehicular systems may analyze the reflected IR light beams 612 to identify the driving assistance markings and extract the driving information relating to the painted road segment(s) from the identified driving assistance markings.

The driving information expressed by the driving assistance markings may include descriptive information relating to one or more transportation infrastructure objects located in the road segment, for example, a junction, a traffic light, a traffic sign, a pedestrian crossing, a bridge, a tunnel, a freeway and/or the like. For example, assuming there is a 4-way junction in the road segment with traffic lights and pedestrian crossings in all four directions. In such case, the driving assistance markings may express the presence of the 4-way junction in the road segment. The driving assistance markings may further indicate the distance to the 4-way junction in the road segment. In another example, assuming there is a sharp left curve in the road segment, the driving assistance markings may report the presence of the sharp left curve in the road segment and may further indicate the distance to the sharp left curve.

The driving assistance markings may further express driving information directed to assist one or more automatic vehicular control systems of one or more of the vehicles to control the vehicle accordingly. For example, assuming there is a sharp right curve in the road segment, the driving assistance markings may express orientation points extending from a certain distance before the beginning of the right curve through the curve and to the end of the curve which may be used by the automatic vehicular control system(s) to accurately maneuver the respective vehicle(s) in the sharp curve. In another example, assuming there is a traffic light in the road segment, the driving assistance markings may indicate a stop line before the traffic light where vehicles must come to a complete stop. The stop line markings may be used by as orientation points by the automatic vehicular control system(s) to identify the exact stop location and may control the vehicle(s) accordingly, for example, apply breaks to fully stop the vehicle(s).

Figure 7A:
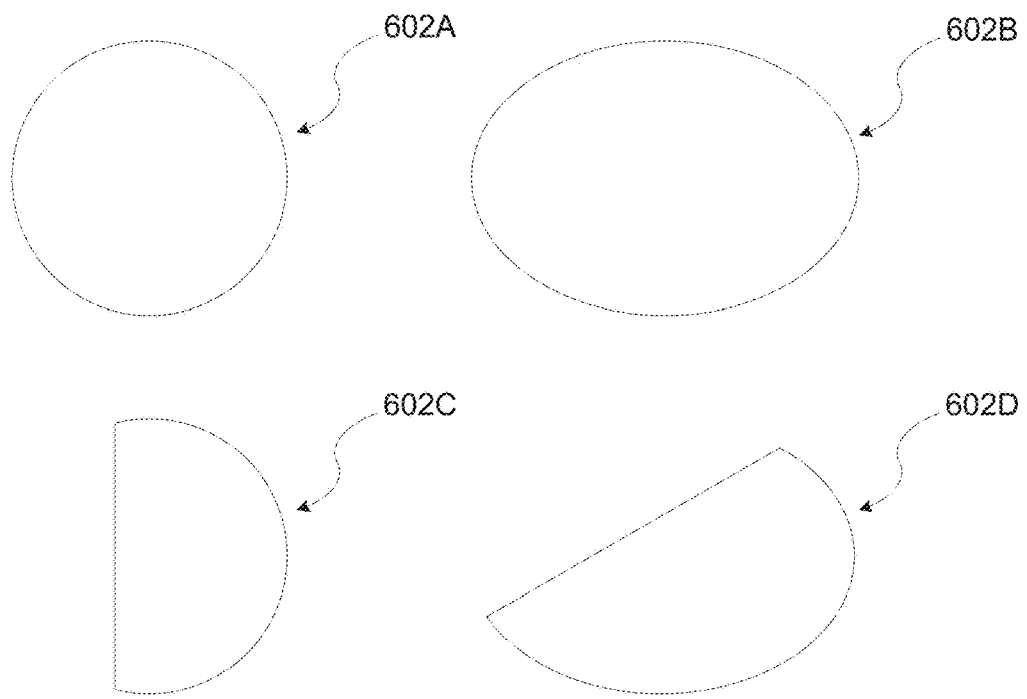
FIG. 7A and FIG. 7B present schematic illustrations of exemplary IR retroreflective spherical elements configured to reflect an incoming IR light beam in a direction substantially parallel to the incoming IR beam for enhancing road markings, according to some embodiments of the present invention.
Figure 7B:
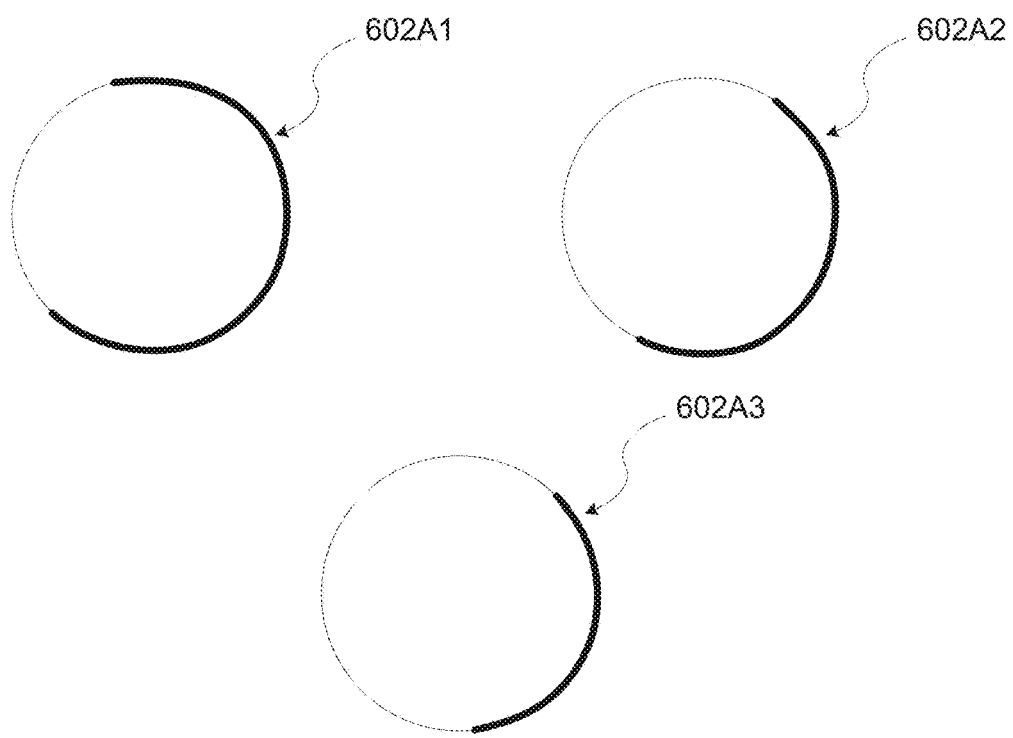

Reference is now made to FIG. 7A and FIG. 7B, which present schematic illustrations of exemplary IR retroreflective spherical elements configured to reflect an incoming IR light beam in a direction substantially parallel to the incoming IR beam for enhancing road markings, according to some embodiments of the present invention.

As seen in FIG. 7A, IR retroreflective spherical elements such as the IR retroreflective spherical element 602 may be constructed, shaped configured and/or produced in a plurality of at least partially spherical shapes having an at least partially spherical structure which may be coated to make the IR retroreflective spherical elements 602 a retroreflector. For example, one or more IR retroreflective spherical elements 602A may be configured in ball shape. In another example, one or more IR retroreflective spherical elements 602B may be configured in ellipsoid shape. In another example, one or more IR retroreflective spherical elements 602C may be configured in as a partial ball having at least part of its surface curved. In another example, one or more IR retroreflective spherical elements 602D may be configured in as a partial ellipsoid having at least part of its surface curved.

As seen in FIG. 7B, the IR retroreflective spherical element 602 may be constructed, shaped configured and/or produced to be at least partially transparent and/or translucent in the visible light spectral range and in one or more of the IR spectral ranges. The IR retroreflective spherical element 602 may be therefore constructed and/or produced using one or more materials, for example, glass, Plexiglass, polymer and/or the like which are known in the art to transfer at least some and typically a high portion of visible light and IR light projected on them.

Each of the IR retroreflective spherical element 602 may be constructed, configured and/or produced to have a reflective surface such as the reflective surface 604 coating at least part of its surface. For example, an exemplary IR retroreflective spherical element 602A1 may be configured with most of its curved surface coated with the reflective surface 604. In another example, an exemplary IR retroreflective spherical element 602A2 may be configured with approximately half of its curved surface coated with the reflective surface 604. In another example, an exemplary IR retroreflective spherical element 602A3 may be configured with only a relatively small section of its curved surface coated with the reflective surface 604.

Figure 8A:
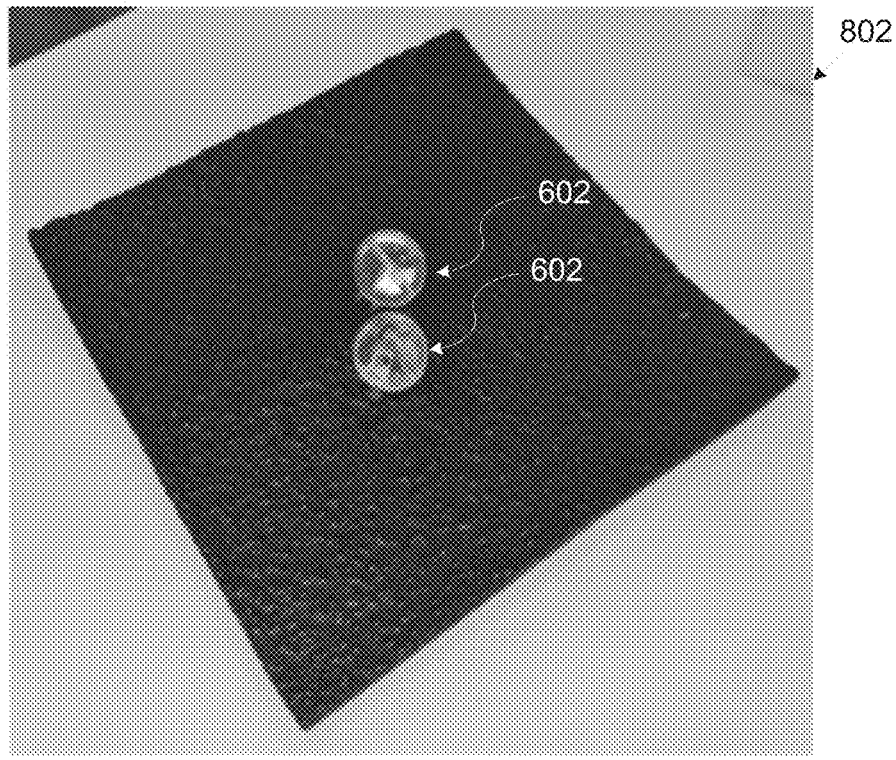
FIG. 8A and FIG. 8B present image captures of exemplary IR retroreflective spherical elements illuminated with visible light and IR light, according to some embodiments of the present invention.
Figure 8A:
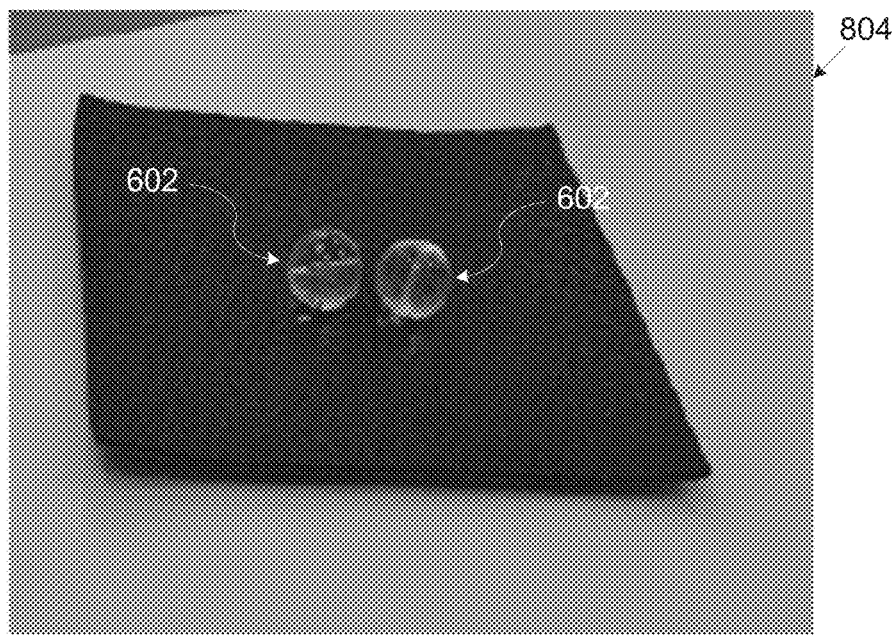
Figure 8B:
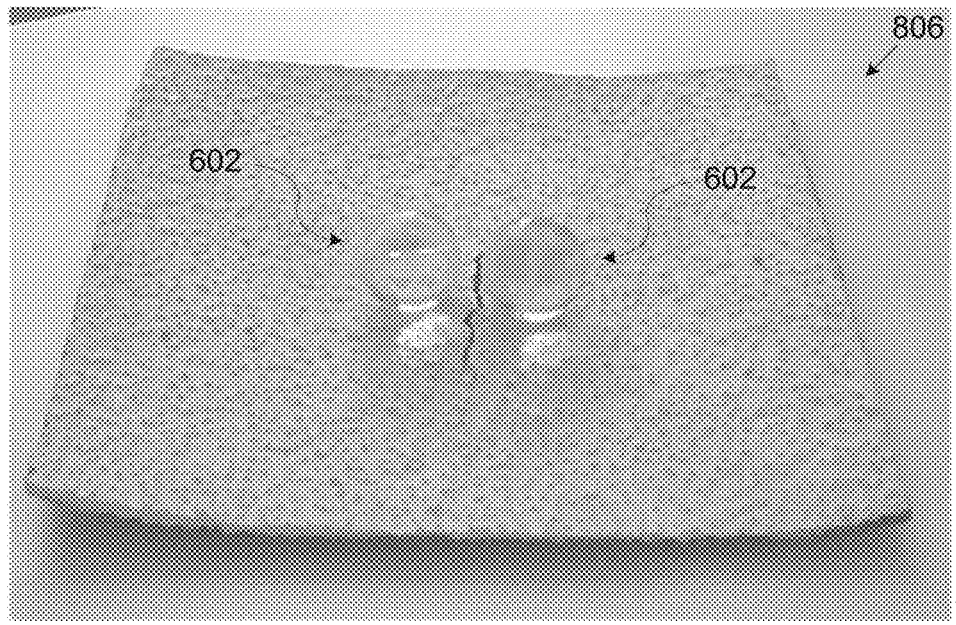
Figure 8B:
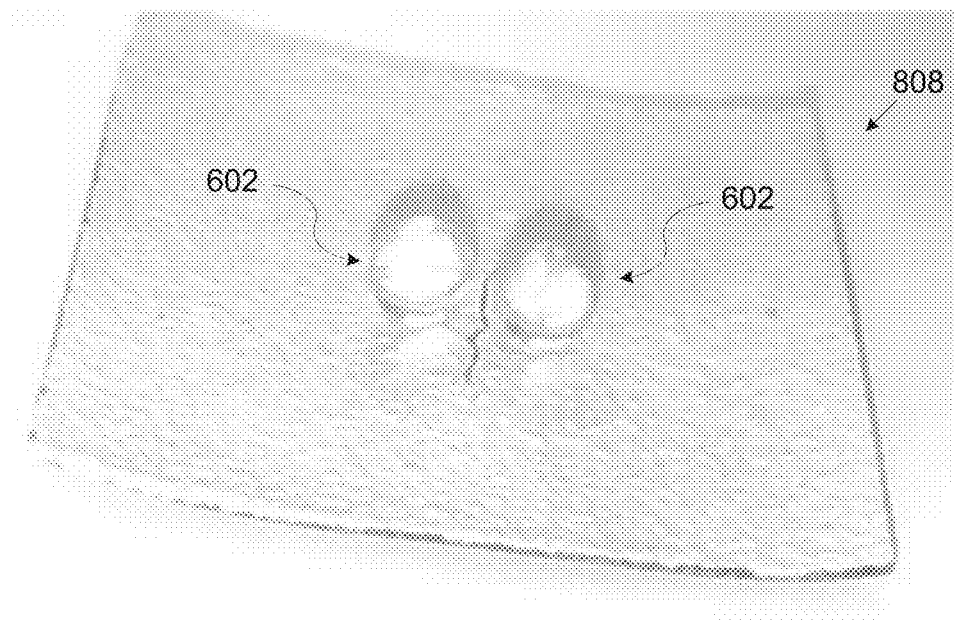

Reference is no made to FIG. 8A and FIG. 8B, which present image captures of exemplary IR retroreflective spherical elements illuminated with visible light and IR light, according to some embodiments of the present invention.

As seen in FIG. 8A, an image capture 802 presents two exemplary IR retroreflective spherical element such as the IR retroreflective spherical element 602 illuminated with non-directed light in the visible light spectral range. As evident, the IR retroreflective spherical elements 602 are significantly transparent and their background material may be easily and clearly visible. An image capture 804 presents the IR retroreflective spherical elements 602 illuminated with directed visible light projected from a specific narrow filed light source. As seen, even under the directed light, the IR retroreflective spherical elements 602 are significantly transparent such that their background material may be easily and clearly visible.

As seen in FIG. 8B, an image capture 806 presents the IR retroreflective spherical elements 602 illuminated with non-directed IR light in an IR spectral range, specifically NIR spectral range. As seen, the IR retroreflective spherical elements 602 are still significantly transparent such that their background material may be clearly visible. However, when illuminated with directed IR light, specifically in the NIR spectral range, as seen in image capture 808, the IR retroreflective spherical elements 602 may significantly reflect the incoming IR light making the IR retroreflective spherical elements 602 highly visible.

According to some embodiments of the present invention, rather than configuring the reflective surface 604 of the IR retroreflective spherical elements 602 to be significantly transparent in the visible light spectral range, the reflective surface 604 may be configured to be substantially similar to the background paint material(s) 606 in the composition 620 in the visible light spectral range while highly reflective of IR light in one or more of the IR spectral ranges.

The reflective surface 604 coating at least part of the curved surface of each IR retroreflective spherical element 602 may be therefore produced of one or more IR reflective materials characterized by two main characteristics: (1) reflect a substantial amount of light in one or more of the IR spectral ranges, and (2) reflect, in the visible spectral range, light substantially similar to the background paint material(s) 606 in the composition 620. For example, the IR reflective material(s) may reflect more than the third value, for example, 25% of the light in the IR spectral range(s), for example, NIR, SWIR and/or the like while reflecting light deviating by less than a fifth value, for example, 25% from the light reflected by the background paint material(s) 606 in the composition 620.

At least some of the plurality of IR retroreflective spherical elements 602 may protrude at least partially out of the surface of the background paint materials(s) 606.

As such, when illuminated with visible light, the IR retroreflective spherical elements may reflect light which is substantially similar to the light reflected by the surrounding background paint material(s) 606 thus making the immersed IR retroreflective spherical elements 602 significantly imperceptible compared to their background paint material(s) 606. However, IR light projected on the IR retroreflective spherical elements 602 may be significantly reflected thus making the IR retroreflective spherical elements 602 highly visible in the IR spectral range(s).

According to some embodiments of the present invention, rather than coating at least part of the surface of the IR retroreflective spherical elements 602, the background paint material(s) 606 in which the IR retroreflective spherical elements 602 are immersed may serve as the reflective surface.

Figure 9:
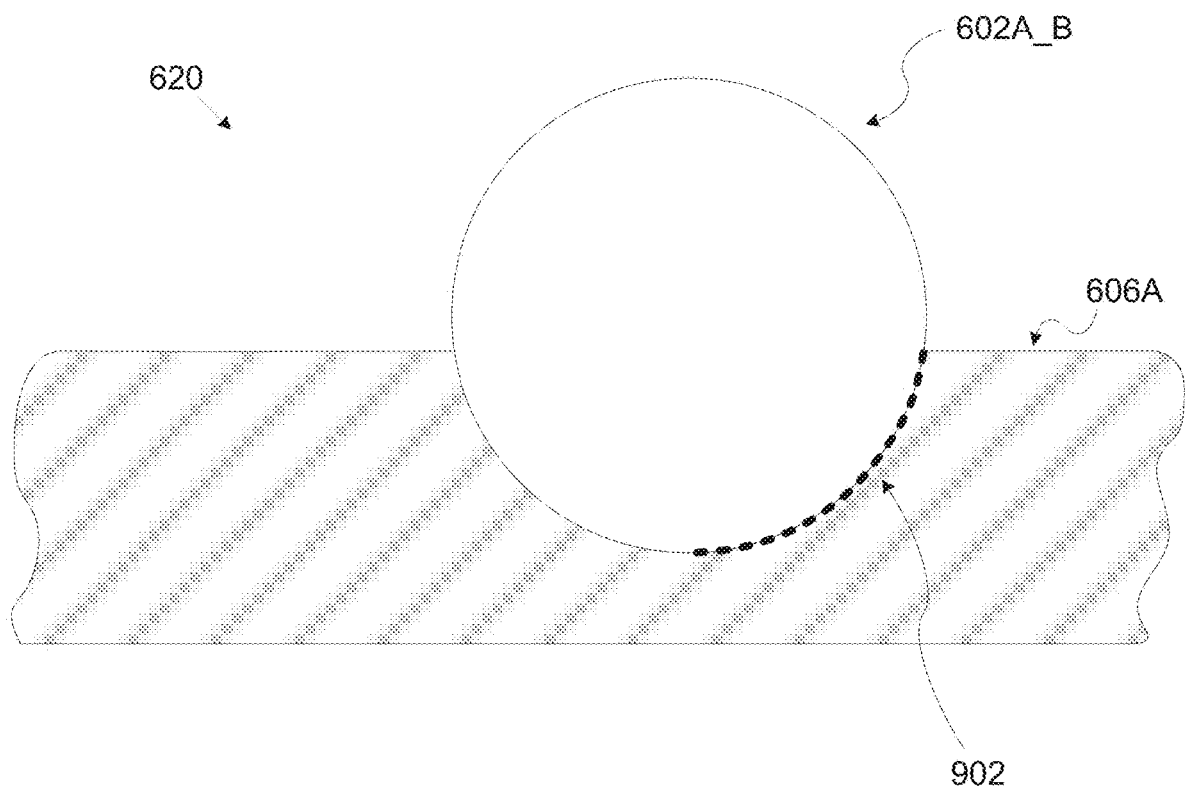
FIG. 9 is a schematic illustration of an exemplary IR retroreflective spherical elements immersed in a paint material configured to reflect incoming IR light beams for enhancing road markings, according to some embodiments of the present invention.

Reference is now made to FIG. 9, which a schematic illustration of an exemplary IR retroreflective spherical elements immersed in a paint material configured to reflect incoming IR light beams for enhancing road markings, according to some embodiments of the present invention.

A plurality of IR retroreflective spherical elements such as the IR retroreflective spherical elements, for example, IR retroreflective spherical elements 602A_B may be immersed in one or more background paint materials such as the background paint material 606, for example, paint material(s) 606A to create a composition such as the composition 620 which may be used to paint road markings, specifically driving assistance markings in one or more road segments.

The IR retroreflective spherical elements 602A_B may be produced from one or more transparent materials, for example, glass, Plexiglass, polymer, and/or the like mixed with one or more pigments which are significantly transparent in one or more of the IR spectral ranges, for example, NIR, SWIR and/or the like.

At least some of the plurality of IR retroreflective spherical elements 602A_B may protrude at least partially out of the surface of the background paint materials(s) 606A in which they are immersed.

The background paint material(s) 606A may be selected and/or configured to reflect a substantial amount of light in one or more of the IR spectral ranges such that the background paint material(s) 606A may serve as a reflective surface 902 for each of the IR retroreflective spherical elements 602A_B of the composition 620 which protrude out of the surface of the background paint material(s) 606A.

Therefore, IR light going through the IR retroreflective spherical elements 602A_B which are significantly transparent to IR light may penetrate the IR retroreflective spherical elements 602A_B until heating the reflective surface 902 formed by the background paint material(s) 606A which may reflect a significant amount of the IR light back in the direction from which the IR light arrives, i.e., retro-reflect the IR light.

Moreover, in order to prevent visual clatter and/or diversion in the visual spectral range, the IR retroreflective spheres 602A_B may be configured to be significantly uniform and/or similar to the background paint material(s) 606A. The pigment(s) mixed with the transparent material(s) to create the IR retroreflective spheres 602A_B may be therefore selected and/or configured to be substantially similar to the background paint material(s) 606A in which the IR retroreflective spherical elements are immersed.

The background paint material(s) 606A may be therefore characterized by reflecting a substantial amount of light in one or more of the IR spectral ranges, for example, more than a sixth value of light in one or more of the IR spectral range(s) (e.g., NIR, SWIR, etc.), for example, 20%, 25%, 30%, 35% and/or the like.

The pigment(s) mixed with the transparent material(s) to produce the IR retroreflective spherical element 602A_B may be characterized by two main characteristics: (1) transfer most of the IR light in the IR spectral range(s), specifically more than a seventh value of the IR light, for example, 65%, 70%, 75%, 80% and/or the like, and (2) reflect visible light that is substantially similar to the background paint material(s) 606A, specifically reflect visible light that deviates by less than an eighth value, for example, 20%, 25%, 30%, 35% and/or the like from the visible light reflected by the background paint material(s) 606A.

The pigment(s) may be selected and/or configured according to the visible light visibility characteristics of the background paint material(s) 606A used to create the composition 620. For example, assuming the background paint material(s) 606A is white, the pigment(s) may selected and/or configured to reflect visible light which does not deviate by more than the eighth value for white color in the visible spectral range. In another example, assuming the background paint material(s) 606A is black, the pigment(s) may selected and/or configured to reflect visible light which does not deviate by more than the eighth value for black color in the visible spectral range, specifically absorb most of the light in the visible light range such that the IR retroreflective spheres 602A_B may appear substantially black.

The IR retroreflective spherical elements 602A_B may be distributed in the background paint material(s) 606A in random orientation.

Figure 10A:
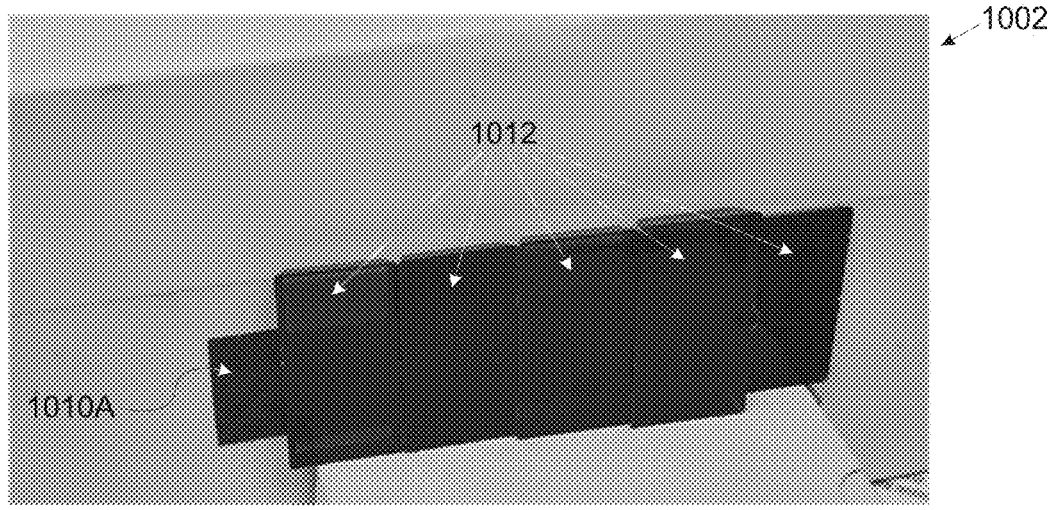
FIG. 10A presents image captures of exemplary IR transparent elements simulating IR retroreflective spherical elements configured to transfer IR light to a background IR reflective strip simulating an IR reflective background paint material, according to some embodiments of the present invention
Figure 10A:
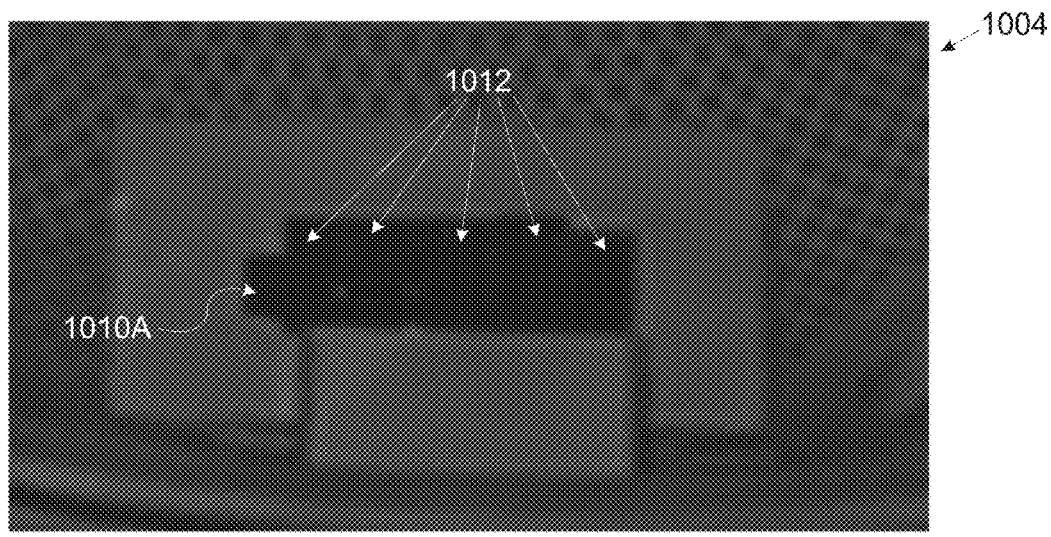
Figure 10A:
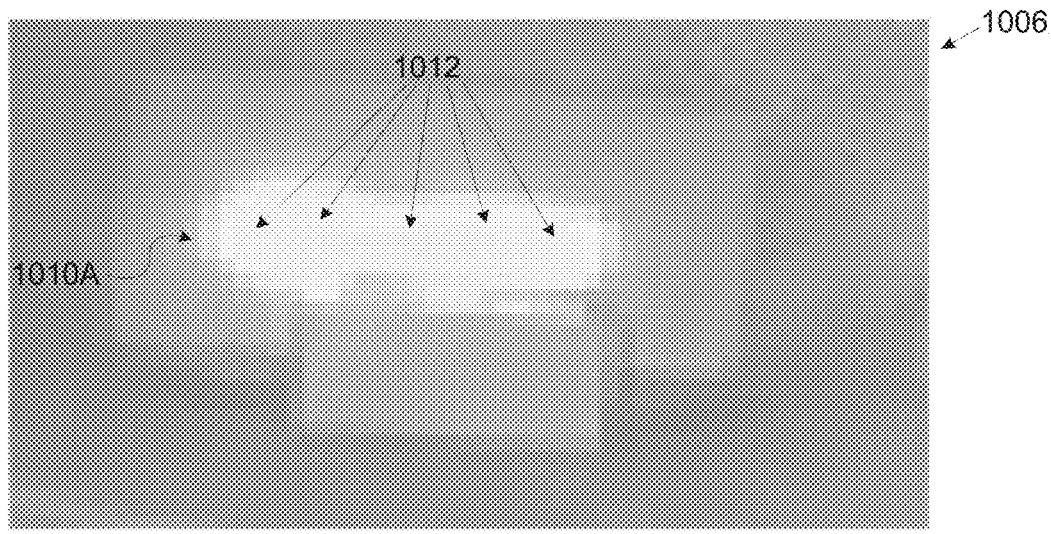

Reference is now made to FIG. 10A, which presents image captures of exemplary IR transparent elements simulating IR retroreflective spherical elements configured to transfer IR light to a background IR reflective strip simulating an IR reflective background paint material, according to some embodiments of the present invention.

An image capture 1002 presents an exemplary IR reflective strip 1010A representing a background paint material such as the background paint material 606A and several rectangular plates 1012 placed in front of the IR reflective strip 1010A to represent IR retroreflective spherical elements such as the IR retroreflective spherical element 602A_B configured to transfer IR light and immersed in the background paint material 606A.

The IR reflective strip 1010A reflects a substantial amount of IR light, for example, more than the sixth value of IR light in one or more of the IR spectral ranges, for example, NIR in approximately 850 nm. In the visible light range, the IR reflective strip 1010A reflects light corresponding to the spectral range of black color, meaning that the IR reflective strip 1010A may absorb most if not all of the light in the visible light spectral range thus appearing black. Optionally, the IR reflective strip 1010A may be constructed of a plurality of tiny IR retroreflective spherical elements configured to reflect a substantial amount of light in one or more of the IR spectral ranges, for example, NIR.

The rectangular plates 1012 are significantly transparent in the IR spectral range(s), specifically such that it may transfer most of the light, for example, more than the seventh value of IR light in one or more of the IR spectral ranges, specifically, NIR in approximately 850 nm. In the visible light range, however, the rectangular plates 1012 may reflect light which is significantly similar to the light reflected by the IR reflective strip 1010A, specifically, the light reflected by the rectangular plates 1012 in the visible light range may not deviate by more than the eighth value from the light reflected by the IR reflective strip 1010A. As such, rectangular plates 1012 may reflect visible light corresponding to the spectral range of black color, meaning that rectangular plates 1012 may absorb most if not all of the light in the visible light spectral range thus appearing black.

As seen in image capture 1004, when illuminating the IR reflective strip 1010A covered by the rectangular plates 1012 with visible light (350 nm-750 nm), the rectangular plates 1012 may appear significantly similar to the background IR reflective strip 1010A.

In image 1006, the IR reflective strip 1010A covered by the rectangular plates 1012 is illuminated with IR light, specifically NIR at around 850 nm, in particular directed IR light which is substantially perpendicular to the IR reflective strip 1010A. As seen, since the rectangular plates 1012 are significantly transparent in the NIR spectral range, the projected IR light may pass through the rectangular plates 1012 and heat the IR reflective strip 1010A serving as a reflective surface such as the reflective surface 902. As evident, due to its high IR light reflective characteristic, the IR reflective strip 1010A may reflect a significant amount of the directed IR light making it appear extremely bright.

Figure 10B:
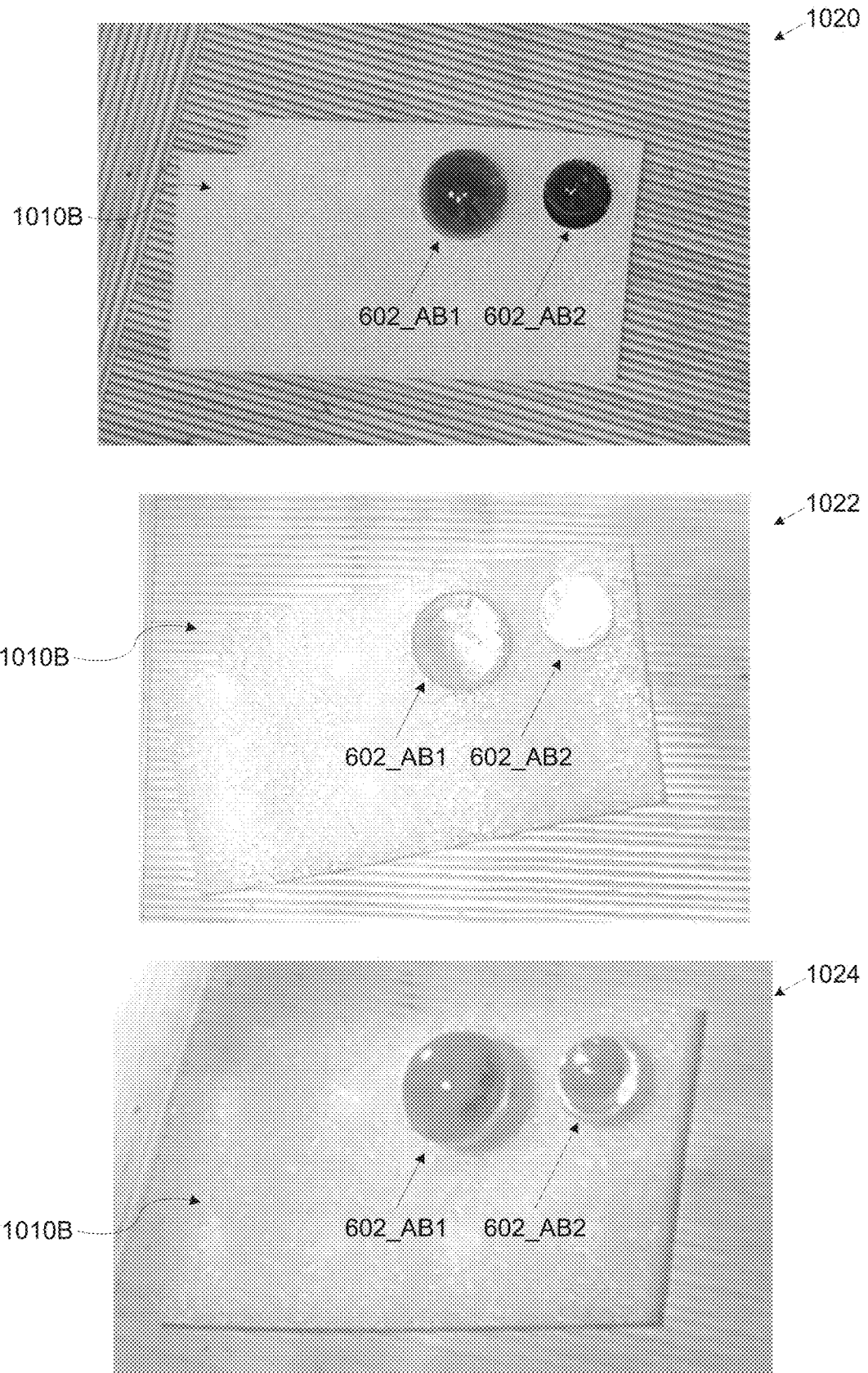
FIG. 10B presents image captures of exemplary IR retroreflective spherical elements configured to transfer IR light to a background IR reflective strip simulating an IR reflective background paint material, according to some embodiments of the present invention.

Reference is also made to FIG. 10B, which presents image captures of exemplary IR retroreflective spherical elements configured to transfer IR light to a background IR reflective strip simulating an IR reflective background paint material, according to some embodiments of the present invention;

Exemplary IR retroreflective spherical elements such as the IR retroreflective spherical element 602_AB, for example, a first IR retroreflective spherical element 602A_AB1 and a second IR retroreflective spherical element 602A_AB2 may be placed on top a IR reflective strip 1010B representing a background paint material such as the background paint material 606A.

The first IR retroreflective spherical element 602A_AB1 may reflect visible light corresponding to a relatively dark color such as brown or dark grey color while the second IR retroreflective spherical element 602A_AB2 may reflect visible light corresponding to a darker color, for example, black. The IR reflective strip 1010B may reflect visible light corresponding to a relatively light color, for example, white.

In the IR the first and second IR retroreflective spherical elements 602A_AB1 and 602A_AB2 may be significantly transparent since they may transfer most the IR light, for example, more than the seventh value of IR light in the IR spectral range(s) while the IR reflective strip 1010B may reflect a substantial amount of IR light, for example, more than the sixth value of IR light in one or more of the IR spectral ranges, for example, NIR in approximately 850 nm.

Therefore, as seen in the image capture 1020, when illuminated with visible light (350 nm-750 nm), the first IR retroreflective spherical element 602A_AB1 and the second IR retroreflective spherical element 602A_AB2 may be seen in their respective colors, i.e., brown and black while the IR reflective strip 1010B may be seen as a white background for the first and second IR retroreflective spherical elements 602A_AB1 and 602A_AB2.

However, as seen in image capture 1022, when illuminated with IR light, for example, NIR in around 850 nm, specifically directed IR illumination, the first and second IR retroreflective spherical element 602A_AB1 and 602A_AB2 may be significantly transparent such that the IR light may reach the IR reflective strip 1010B and be reflected back towards the direction of illumination.

Moreover, as seen in image capture 1024, when illuminated with IR light which is not directed, i.e., not perpendicular to the IR reflective strip 1010B, while the first and second IR retroreflective spherical element 602A_AB1 and 602A_AB2 may be significantly transparent, the IR light may not be reflected by the IR reflective strip 1010B towards the direction of illumination thus ensuring the retro-reflection operation of a paint composition such as the composition 620 where the IR reflective strip 1010B represents the background paint material 606A.

Figure 11:
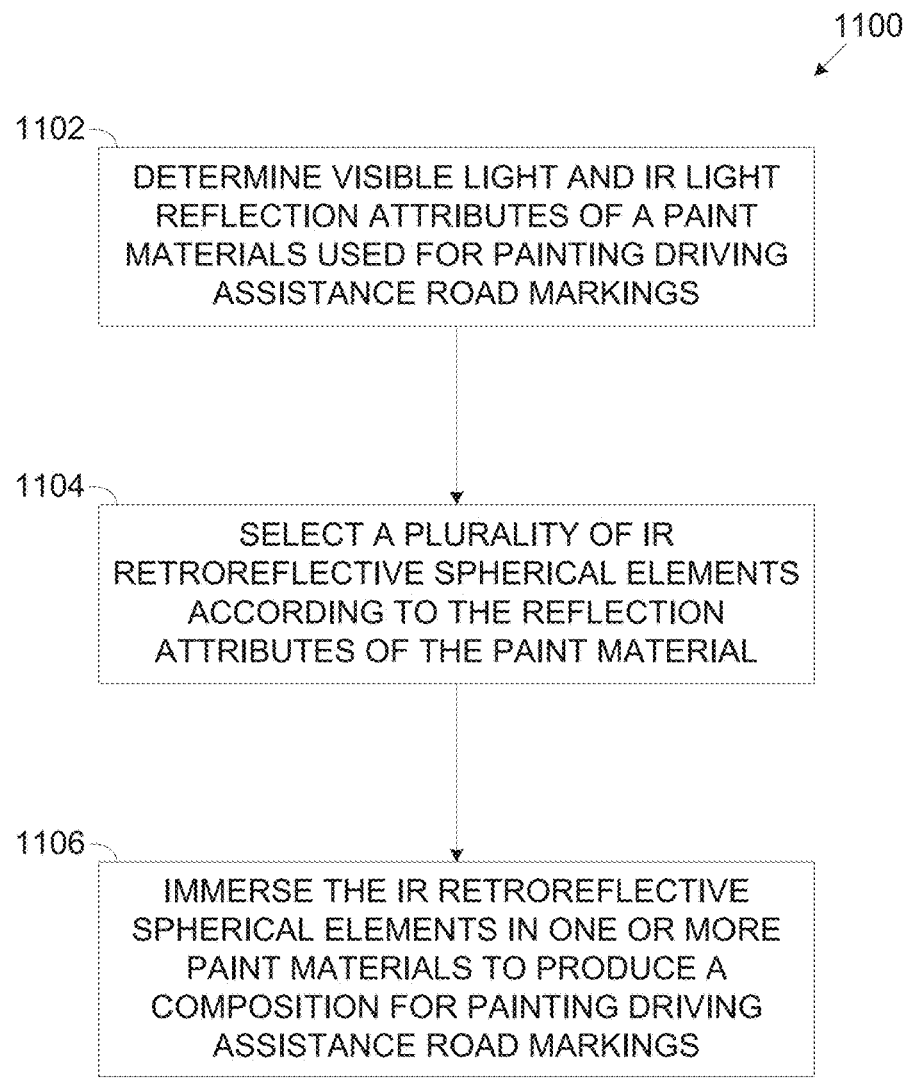
FIG. 11 is a flowchart of an exemplary process of creating a composition comprising IR retroreflective spherical elements for enhancing road markings, according to some embodiments of the present invention.

Reference is now made to FIG. 11, which is a flowchart of an exemplary process of creating a composition comprising IR retroreflective spherical elements for enhancing road markings, according to some embodiments of the present invention.

An exemplary process 1100 may be executed to create a composition such as the composition 620 which may be used for painting road markings, specifically driving assistance markings by immersing a plurality of IR retroreflective spherical elements such as the IR retroreflective spherical element 602 in one or more background paint materials such as the background paint materials 606.

As shown at 1102, the process 1100 starts with determining one or more light reflection attributes of the background paint material(s) 606 selected for the composition 620 created for painting road markings.

The light reflection attributes may include indicate, express and/or define the light reflection of the background paint material(s) 606 in one or more of the light spectral ranges, for example, the visible light spectral range, one or more of the IR spectral ranges (e.g. NIR, SWIR, etc.) and/or the like. The light reflection attributes may therefore define visibility of the background paint material(s) 606 in one or more of the light spectral ranges, for example, color, intensity, transparency, opacity and/or the like.

As shown at 1104, a plurality of IR retroreflective spherical elements 602 may be selected, optionally according to one or more of the light reflection attribute(s) of the background paint material(s) 606.

In particular, the IR retroreflective spherical elements 602 may be selected according to the reflective attributes of a reflective surface such as the reflective surface 604 coating at least part of their curved surfaces. Additionally and/or alternatively, the IR retroreflective spherical elements 602 may be produced, constructed and/or painted with one or more of the IR reflective material(s) selected according to one or more of their reflective attributes.

Primarily, the reflective surface 604 must reflect more than the third value of IR light in one or more of the IR spectral ranges, for example, more than 25% of the IR light.

Moreover, in case the reflective surface 604 is configured to be substantially transparent, the IR reflective material(s) selected to create the reflective surface 604 may be such materials which transfer more than the fourth value of visible light, for example, more than 70% of visible light. However, in case the in case the reflective surface 604 is configured to be substantially similar, in the visible light spectral range, to the background paint material(s) 606 of the composition 620 (e.g. same color), the IR reflective material(s) selected to create the reflective surface 604 may be such materials which reflect visible light deviating buy less than the fifth value, for example, 25% from the visible light reflected by the background paint material(s) 606.

In case the selected IR retroreflective spherical elements 602 are the IR retroreflective spherical elements 602A_B which are not coated, the background paint material(s) 606, specifically one or more background paint materials such as the background paint material(s) 606A may be selected and/or configured to further reflect more than the sixth value of IR light in one or more of the IR spectra ranges. Moreover, in such case, the IR retroreflective spherical elements 602A_B may be produced from one or more of the transparent materials (e.g., glass, Plexiglass, polymer, etc.) mixed with one or more of the pigments characterized by (1) transferring more than the seventh value of the IR light (e.g. 70%), and (2) reflecting visible light that deviates by less than the eighth value (e.g. 25%) from the visible light reflected by the background paint material(s) 606A.

As shown at 1106, the plurality of selected IR retroreflective spherical elements 602 may be immersed in the selected background paint material(s) 606 to create the composition 620 which may be sued to paint road markings, for example, driving assistance markings in one or more road segments.

As described herein before, the plurality of selected IR retroreflective spherical elements 602 may be immersed in the background paint material(s) 606 in randomly distribution by simply dropping them, typically uniformly into the background paint material(s) 606.

However, optionally, the plurality of selected IR retroreflective spherical elements 602 may be immersed in the background paint material(s) 606 in directed orientation to have their coated concave surfaces facing an exterior surface of the composition 620. One or more methods may be applied for immersing the IR retroreflective spherical elements 602 in the background paint material(s) 606 in directed orientation, for example, pick and place and/or the like. In another example, the IR retroreflective spherical elements 602 may be configured, adapted and/or produced to have their center of mass located in close proximity to the coated concave surfaces such that when dropped into the background paint material(s) 606, the coated concave surfaces be located substantially at the bottom of the immersed IR retroreflective spherical elements 602 thus facing substantially upwards towards the exterior surface of the composition 620.

Figure 12:
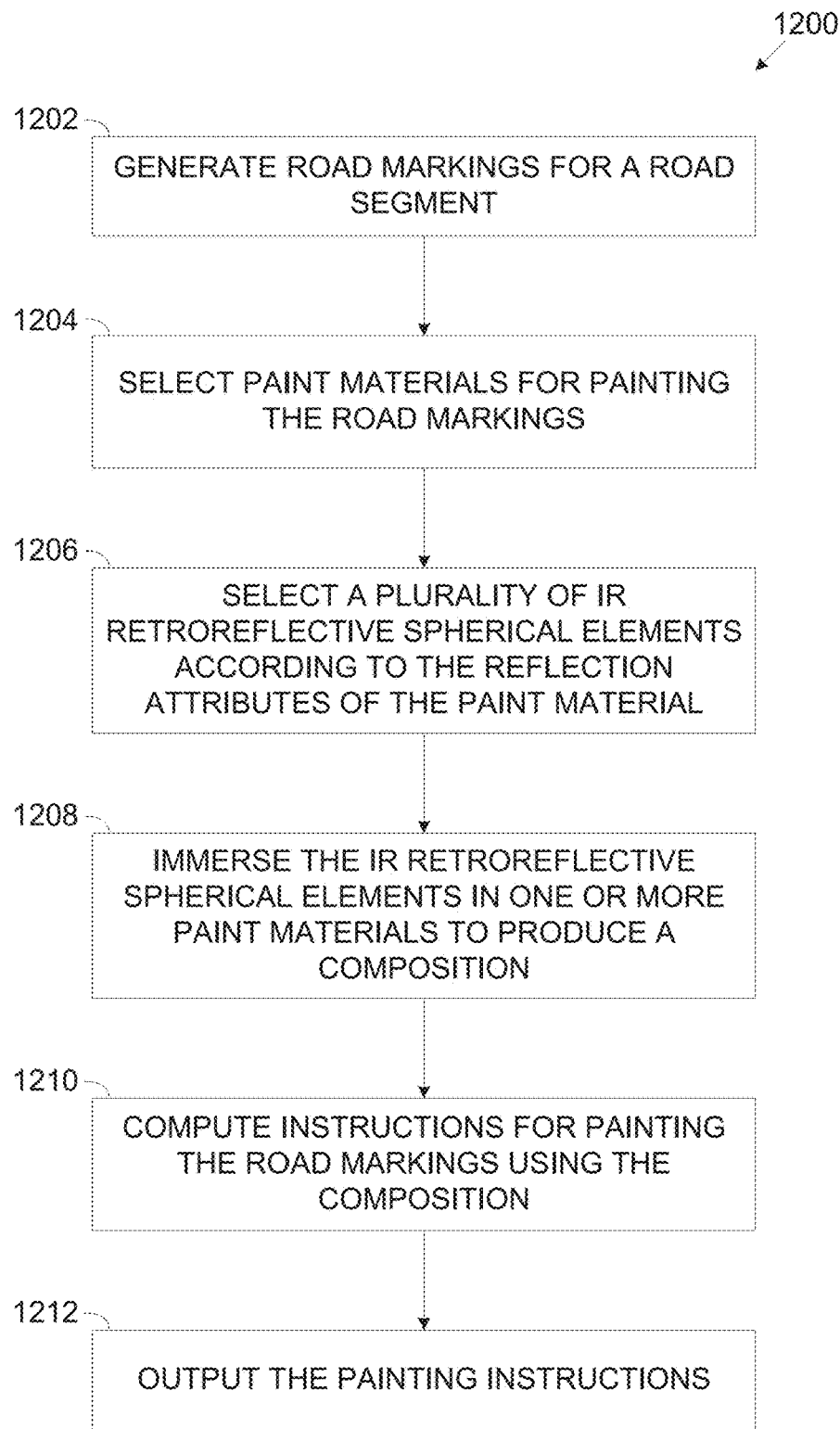
FIG. 12 is a flowchart of an exemplary process of computing instructions for painting enhanced road marking using paint material(s) comprising IR retroreflective spherical elements, according to some embodiments of the present invention.

Reference is now made to FIG. 12, which is a flowchart of an exemplary process of computing instructions for painting enhanced road marking using paint material(s) comprising IR retroreflective spherical elements, according to some embodiments of the present invention.

An exemplary process 1200 may be executed by a road markings generation system such as the road marking generation system 200, specifically by a road markings engine such as the road markings engine 220 to compute instructions for painting, in one or more road segments, enhanced driving assistance markings which are highly visible in one or more of the IR spectral ranges, for example NIR, SWIR and/or the like while highly imperceptible in the visible light spectral range.

As shown at 1202, the process 1200 starts with the road markings engine 220 generating and/or computing road markings, for example, driving assistance markings for a road segment.

Optionally, the road markings engine 220 may generate the driving assistance markings based on analysis of one or more images of the road segment.

The computed driving assistance markings which are directed to support the automated vehicular system(s) of one or more vehicles riding through the road segment may express descriptive information relating to one or more of the transportation infrastructure objects located in the road segment to inform the automated vehicular system(s) and/or assistive information to assist and/or support the automatic vehicular system(s) in control operation of the vehicle(s).

As shown at 1204, the road markings engine 220 may select one or more background paint materials such as the background paint material 606, typically based on the generated driving assistance markings to create a composition such as the composition 620 for painting the driving assistance markings at the road segment.

For example, assuming the driving assistance markings include markings which should be painted on one or more road surfaces of the road segment, the road markings engine 220 may select light color background paint material(s) 606 which are easily and clearly distinguishable from the road surface, for example, a white paint material, a yellow paint material, an orange paint material and/or the like. In another example, assuming the driving assistance markings include markings which should be painted on one or more traffic sigs having a white background, the road markings engine 220 may select dark color background paint material(s) 606 which are easily and clearly distinguishable from the white background, for example, a black paint material, a red paint material, a blue paint material and/or the like. Naturally, the selected background paint material(s) must comply with the traffic regulation applicable for the road segment.

Moreover, in case the selected background paint material(s) 606 are background paint material(s) such as the background paint material(s) 606A, the background paint material(s) 606A may be selected and/or configured to further reflect more than the sixth value of IR light in one or more of the IR spectra ranges.

As shown at 1206, the road markings engine 220 may select a plurality of IR retroreflective spherical elements 602 as described in step 1104 of the process 1100, typically based on the light reflection attributes determined for the selected background paint material(s) 606 (designated 606 hereinafter but may include background paint material(s) 606 and/or 606A according to the selected implementation).

As shown at 1208, the plurality of IR retroreflective spherical elements 602 may be immersed in the background paint material(s) 606 as described in step 1106 of the process 110 to create the composition 620.

As shown at 1210, the road markings engine 220 may compute instructions for painting the driving assistance markings generated for the road segment.

As shown at 1212, the road markings engine 220 may output the painting instructions computed for painting the driving assistance markings at the road segment using the composition 620 comprising the IR retroreflective spherical elements 602 immersed in the background paint material(s) 606.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms infrared reflective, absorptive and/or semi-transparent paint materials and retroreflective elements are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of enhancing road markings using Infrared (IR) retroreflective spherical elements, comprising:
    immersing a plurality of IR retroreflective spherical elements in at least one paint material to produce a composition, each of the plurality of IR retroreflective spherical elements is at least partially transparent in visible light spectral range and in at least one infrared spectral range and is at least partially coated with at least one IR reflective material characterized by (1) reflecting more than a first value of light in the at least one infrared spectral range, and (2) transferring more than a second value of light in the visible light spectral range;

wherein the composition is applied to paint road markings on at least one surface of at least one road segment, the painted road markings expressing driving information relating to the at least one road segment.

2. The method of claim 1, wherein the plurality of IR retroreflective spherical elements are produced of at least one partially transparent material which is a member of a group consisting of: glass, silicate glass, Plexiglass and polymer.

3. The method of claim 1, wherein at least some of the plurality of IR retroreflective spherical elements protrude at least partially from the at least one paint material.

4. The method of claim 1, wherein the first value is larger than 25%.

5. The method of claim 1, wherein the second value is larger than 70%.

6. The method of claim 1, wherein the plurality of IR retroreflective spherical elements are distributed in the at least one paint material in random orientation.

7. The method of claim 1, wherein the plurality of IR retroreflective spherical elements are distributed in the at least one paint material in directed orientation with their concave surface coated with the at least one IR reflective material facing a common direction towards an exterior surface of the composition.

8. The method of claim 1, wherein the at least one IR spectral range is a member of a group consisting of: near infrared (NIR) having a wavelength in a range of 700-1000 nanometers and short wave infrared (SWIR) having a wavelength in a range of 1000-3000 nanometers.

9. The method of claim 1, wherein the at least one surface is a member of a group consisting of: a surface of the at least one road segment, a colored mark printed on the at least one road segment and an infrastructure object located in proximity to the at least one road segment.

10. The method of claim 1, wherein the driving information is directed to support at least one automatic vehicular system of at least one vehicle, the at least one automatic vehicular system receives at least one image of the at least one surface painted with the road markings captured by at least one imaging sensor adapted to operate in the at least one infrared spectral range.

11. A method of enhancing road markings using Infrared (IR) retroreflective spherical elements, comprising:

immersing a plurality of IR retroreflective spherical elements in at least one paint material to produce a composition, each of the plurality of IR retroreflective spherical elements is at least partially transparent in visible light spectral range and in at least one infrared spectral range and is at least partially coated with at least one IR reflective material characterized by (1) reflecting more than a first value of light in the at least one infrared spectral range, and (2) reflecting light in the visible light spectral range deviating less than a second value from the light reflected in the visible light spectral by the at least one paint material;

wherein the composition is applied to paint road markings on at least one surface of at least one road segment, the road markings expressing driving information relating to the at least one road segment.

12. The method of claim 11, wherein the first value is larger than 25%.

13. The method of claim 11, wherein the second value is less than 25%.

14. The method of claim 11, wherein the plurality of IR retroreflective spherical elements are distributed in the at least one paint material in random orientation.

15. The method of claim 11, wherein the plurality of IR retroreflective spherical elements are distributed in the at least one paint material in directed orientation with their concave surface coated with the at least one IR reflective material facing a common direction towards an exterior surface of the composition.

16. A method of enhancing road markings using Infrared (IR) retroreflective spherical elements, comprising:

immersing a plurality of IR retroreflective spherical elements in at least one background paint material to produce a composition, the at least one background paint material reflects more than a first value of light in at least one infrared spectral range, each of the plurality of IR retroreflective spherical elements is constructed of at least one infrared transparent material mixed with at least one pigment characterized by (1) transferring more than a second value of light in the at least one infrared spectral range, and (2) reflecting light deviating less than a third value from the light reflected by the at least one background paint material in visible light spectral range;

wherein the composition is applied to paint road markings on at least one surface of at least one road segment, the painted road markings expressing driving information relating to the at least one road segment.

17. The method of claim 16, wherein the plurality of IR retroreflective spherical elements are produced of at least one partially transparent material which is a member of a group consisting of: glass, silicate glass, Plexiglass and polymer.

18. The method of claim 16, wherein the first value is larger than 25%.

19. The method of claim 16, wherein the second value is larger than 70%.

20. The method of claim 16, wherein the third value is less than 25%.

* * * * *